(12) United States Patent
Johnson et al.

(10) Patent No.: US 10,837,780 B2
(45) Date of Patent: Nov. 17, 2020

(54) MOBILE STRUCTURE HEADING AND PILOTING SYSTEMS AND METHODS

(71) Applicant: FLIR Belgium BVBA, Meer (BE)

(72) Inventors: Mark Johnson, Vannes (FR); Chris Hodgson, Ploeren (FR); Christopher Yeomans, Fareham (GB)

(73) Assignee: FLIR Belgium BVBA, Meer (BE)

( * ) Notice: Subject to any disclaimer, the term of this patent is extended or adjusted under 35 U.S.C. 154(b) by 197 days.

(21) Appl. No.: 15/785,319

(22) Filed: Oct. 16, 2017

(65) Prior Publication Data

US 2018/0106619 A1    Apr. 19, 2018

Related U.S. Application Data

(60) Provisional application No. 62/409,306, filed on Oct. 17, 2016.

(51) Int. Cl.
| | | |
|---|---|---|
| *G01C 21/18* | (2006.01) | |
| *G01C 21/16* | (2006.01) | |
| *G01C 25/00* | (2006.01) | |

(52) U.S. Cl.
CPC ............ *G01C 21/18* (2013.01); *G01C 21/16* (2013.01); *G01C 25/005* (2013.01)

(58) Field of Classification Search
CPC .................................. G01C 21/18; G01C 21/16
See application file for complete search history.

(56) References Cited

U.S. PATENT DOCUMENTS

| | | | |
|---|---|---|---|
| 5,719,764 A | 2/1998 | McClary | |
| 5,841,537 A | 11/1998 | Doty | |
| 8,078,343 B2 | 12/2011 | Ferreira et al. | |
| 8,209,069 B1 | 6/2012 | McLoughlin et al. | |
| 8,768,620 B2 | 7/2014 | Miller et al. | |
| 2005/0150289 A1 | 7/2005 | Osborne | |
| 2011/0276305 A1* | 11/2011 | Rinnan | B63B 39/00 702/141 |
| 2011/0307213 A1* | 12/2011 | Zhao | G06F 1/1626 702/153 |
| 2013/0030754 A1* | 1/2013 | Tu | G01C 21/165 702/141 |
| 2013/0066578 A1* | 3/2013 | Tu | G01C 25/005 702/87 |
| 2016/0047675 A1* | 2/2016 | Tanenhaus | G01C 25/005 702/104 |
| 2018/0058857 A1* | 3/2018 | Yost | G01C 21/165 |

* cited by examiner

*Primary Examiner* — Jess Whittington
(74) *Attorney, Agent, or Firm* — Haynes and Boone, LLP

(57) ABSTRACT

Techniques are disclosed for systems and methods for navigating mobile structures. The mobile structure may include a main attitude & heading reference system (AHRS) and one or more devices. The one or more devices may include a slave AHRS such as a gyroscope. Data may be transmitted from the main AHRS to the one or more devices through a network. Latency may be present in the transmission of data. As such, data from the slave AHRS may be used to determine changes in heading and/or attitude of the mobile structure to compensate for such latency. In addition, such data may be used to determine changes in wind direction and/or heading experienced by the mobile structure.

19 Claims, 14 Drawing Sheets

MOBILE STRUCTURE HEADING AND PILOTING SYSTEMS AND METHODS

CROSS REFERENCE TO RELATED APPLICATIONS

This application claims the benefit of and priority to U.S. Provisional Patent Application No. 62/409,306 filed Oct. 17, 2016 and entitled "MOBILE STRUCTURE HEADING AND PILOTING SYSTEMS AND METHODS," which is incorporated herein by reference in its entirety.

TECHNICAL FIELD

One or more embodiments of the invention relate generally to navigational systems and more particularly, for example, to systems and methods for piloting of mobile structures.

BACKGROUND

Navigational systems aid in the operation of watercraft and other mobile structures. A mobile structure may include multiple such navigational systems and/or sensors, including one or more attitude and heading reference systems (AHRSs). Some conventional systems with multiple AHRSs typically require significant factory and in-use calibration, which undesirably increases operational cost and complexity. Other conventional systems include a single AHRS, and system latency can degrade navigational awareness and/or render autopilot operation relatively unreliable.

SUMMARY

Techniques are disclosed for systems and methods for navigating mobile structures. In certain embodiments, the system may include a logic device configured to communicate with a plurality of navigational sensors, where each navigational sensor may be configured to provide navigational data associated with a mobile structure, and the plurality of navigational sensors comprises at least a gyroscope and an attitude & heading reference system (AHRS). The logic device may be configured to receive attitude and/or heading data from the AHRS and angular velocity data from the gyroscope, determine a first orientation and/or position of the mobile structure from the attitude and/or heading data, and determine a second orientation and/or position of the mobile structure with the gyroscope data.

In other embodiments, a method may be disclosed. The method may include receiving attitude and/or heading data from an attitude & heading reference system (AHRS) and receiving angular velocity data from a gyroscope, determining a first orientation and/or position of a mobile structure from the attitude and/or heading data, and determining a second orientation and/or position of the mobile structure with the gyroscope data.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1A:
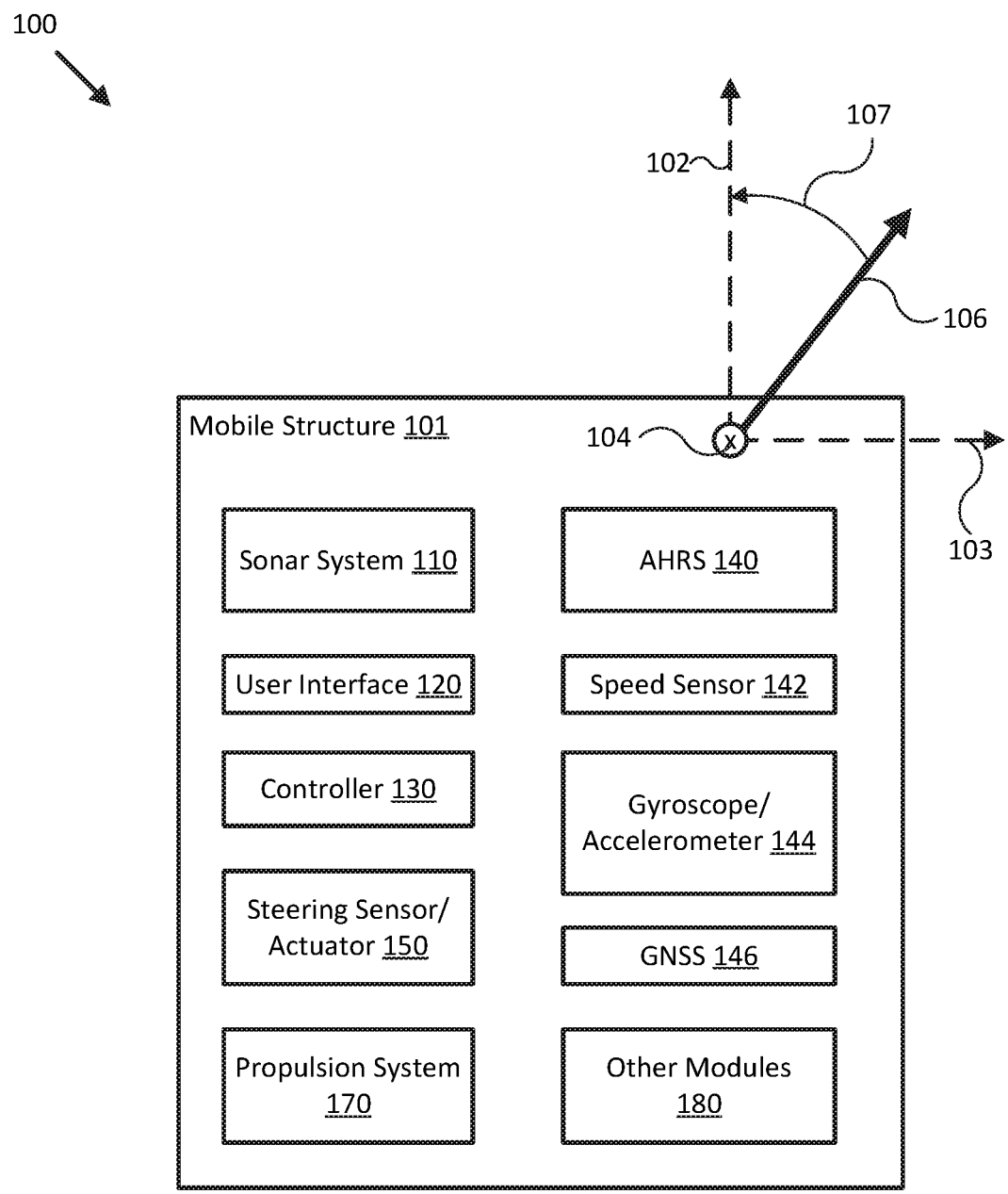
FIG. 1A illustrates a block diagram of a mobile structure in accordance with an embodiment of the disclosure.

In accordance with various embodiments of the present disclosure, systems and processes for removing bus latency from AHRS equipped systems may be disclosed herein. In accordance with certain other embodiments of the present disclosure, systems and processes for determining wind characteristics on a moving mobile structure are disclosed herein. Mobile structures may include various navigational sensors such as attitude & heading reference systems (AHRS), imaging devices, sonar systems including one or more sonar transducer assemblies, radar systems, other ranging sensor systems, global navigation satellite system (GNSS) systems and/or other position sensors, orientation sensors, gyroscopes, accelerometers, and/or speed sensors providing measurements of an orientation, a position, an acceleration, and/or a speed of the sensor, the sonar/radar/ranging sensor assemblies, a coupled mobile structure, and/or other navigational sensors.

For example, the sensors may be mounted to or within the mobile structure (e.g., a watercraft, aircraft, motor vehicle, and/or other mobile structure), may be integrated with other sensor assemblies, or may be integrated within a portable device. Examples of portable devices include portable GNSS devices, smartphones, tablets, portable computers, portable sensor suites, cameras, and other devices. Embodiments of the present disclosure provide sensor fusion that may combine sensor data from a plurality of sensors and present the sensor data according to a single reference frame, thereby providing enhanced data to a user that may also be more intuitive and easier to interpret than individually referenced data from each of the sensors.

Multiple devices on vehicles can benefit from an AHRS. However, AHRS are computationally intensive and require calibration during manufacture and after installation on such vehicles. As such, such vehicles often only include one AHRS and use a digital communication network to propagate the AHRS output to multiple devices. Such networks may often feature update rate restrictions, such as a 10 Hz data repetition interval, and sometimes such networks may be structured so that one device forwards data to another device (e.g., a device may obtain heading data and re-transmit such heading data through the network to a radar subsystem for the vehicle). Such steps add latency, yet many applications are intolerant to heading latency. For example, introducing a 0.2 s latency to a boat turning at 20°/s will produce a 4° heading error, which represents >1000 meters of azimuth position error for a radar target at a 10 Nautical mile range. Furthermore, it is desirable that different devices on such vehicles use the same/a common heading reference. Yet experience shows that two heading sources on a vessel rarely provide identical readings. Accordingly, a single AHRS, providing a unique master attitude and heading, coupled with slave devices that are capable of refreshing AHRS data locally without incurring the timing and other reliability and accuracy costs of reproducing the full AHRS implementation, as described here, offer advantages.

For example, in such an embodiment, signal processing associated with a radar and/or other sensor system of a mobile structure may mix an onboard gyroscope signal (e.g., from a sensor integrated with the radar and/or other sensor system) with roll, pitch, and yaw (RPY) data received over the network. Such data received over the network may include a mean signal delay introduced by the network. Such signal processing may produce a reconditioned RPY output that accurately and reproducibly accounts for the signal delay, and/or a debug output (e.g., a debug output such as a gyroscope bias estimate), that can be used to produce a radar signal and/or other sensor system output that more accurately corresponds to the orientation of the mobile structure and/or the sensor system.

The invention described herein may be applied to rigid bodies, where the rotational rates of the rigid bodies, as measured by a 3 axis gyroscope (usually a micro-electromechanical sensor) are substantially identical at all points throughout the rigid body. As such, a gyroscope coupled somewhere to the body will experience substantially the same rotation rates as an on-board AHRS that is also measuring roll pitch and yaw of the rigid body. Accordingly, the output of the gyroscope may be used to correct for latency and/or sampling delays that may arise when communicating the AHRS output from one point to another using digital communications systems (e.g., a controller area network (CAN), Ethernet, and/or other such communication systems).

In certain embodiments, a radar may be connected "second hand" via Ethernet, CAN, and/or other network protocol(s) to an AHRS. The delays and sample times of the networks may be such that the radar may receive heading data "late." The AHRS may also be of unknown quality, possibly provided by a third party manufacturer. For all these reasons, improving the signal quality of the heading and attitude data received by the radar through a built in/integrated gyroscope may be beneficial.

FIG. 1A illustrates a block diagram of a mobile structure in accordance with an embodiment of the disclosure. In various embodiments, system 100 may be adapted to measure an orientation, a position, an acceleration, and/or a speed of mobile structure 101, and/or other elements of system 100. System 100 may include a plurality of navigational sensors that may produce navigational data. For example, such navigational sensors may include a sonar system 110, a steering sensor/actuator 150, an AHRS 140, a speed sensor 142, a gyroscope/accelerometer 144, a GNSS 146, and/or other modules 180 (i.e., a radar system, other ranging sensors, various environmental sensors, sensors directed towards the dynamic characteristics of the mobile structure, and/or other sensors). In certain embodiments, a plurality of certain types of the same sensor may be included within system 100.

System 100 may use these measurements to form various views of sensor data provided by various navigational sensors within system 100 and/or to adjust an orientation of one, some, or all of the navigational systems of system 100 according to a desired operation of elements of system 100 and/or mobile structure 101. In some embodiments, system 100 may display resulting sensor data and/or imagery to a user through user interface 120, and/or use the sensor data and/or imagery to control operation of mobile structure 101, such as controlling steering actuator 150 and/or propulsion system 170 to steer mobile structure 101 according to a desired heading, such as heading angle 107, for example.

In the embodiment shown in FIG. 1A, system 100 may be implemented to provide sensor data and/or imagery for a particular type of mobile structure 101, such as a drone, a watercraft, an aircraft, a robot, a vehicle, and/or other types of mobile structures. In one embodiment, system 100 may include one or more of sonar system 110, user interface 120, controller 130, AHRS 140, speed sensor 142, gyroscope/accelerometer 144, GNSS 146, steering sensor/actuator 150, propulsion system 170, and one or more other sensors and/or actuators, such as other modules 180. In some embodiments, one or more of the elements of system 100 may be implemented in a combined housing or structure that can be coupled to mobile structure 101 and/or held or carried by a user of mobile structure 101.

Directions 102, 103, and 104 describe one possible coordinate frame of mobile structure 101 (e.g., for headings or orientations measured by AHRS 140 and/or angular velocities and accelerations measured by gyroscope/accelerometer 144). As shown in FIG. 1A, direction 102 illustrates a direction that may be substantially parallel to and/or aligned with a longitudinal axis of mobile structure 101, direction 103 illustrates a direction that may be substantially parallel to and/or aligned with a lateral axis of mobile structure 101, and direction 104 illustrates a direction that may be substantially parallel to and/or aligned with a vertical axis of mobile structure 101, as described herein. For example, a roll component of motion of mobile structure 101 may correspond to rotations around direction 102, a pitch component may correspond to rotations around direction 103, and a yaw component may correspond to rotations around direction 104.

In certain embodiments, orientation and/or position sensors (OPSs) may be included on mobile structure 101. The OPSs may be individually coupled to mobile structure 101 or may be contained within other modules and systems such as sonar system 110 and various imaging systems. The orientation and/or position sensors may detect the roll, pitch, and/or yaw of mobile structure 101 and output data related to the roll, pitch, and/or yaw to controller 130. Controller 130 may then utilize roll, pitch, and/or yaw to correct data obtained by various sensors and systems coupled to mobile structure 101 (e.g., sonar, radar, and/or other ranging sensor systems, and/or other sensors). For example, sonar data of a seafloor may be significantly affected by roll, pitch, and/or yaw of a mobile structure because emitted sonar pulses may then travel to the ocean floor at an angle, which can significantly increase the detected distance. Using data related to corresponding angles of roll, pitch, and/or yaw, controller 130 may then correct or otherwise adjust such erroneous readings.

Heading angle 107 may correspond to the angle between a projection of a reference direction 106 (e.g., the local component of the Earth's magnetic field) onto a horizontal plane (e.g., referenced to a gravitationally defined "down" vector local to mobile structure 101) and a projection of direction 102 onto the same horizontal plane. In some embodiments, the projection of reference direction 106 onto a horizontal plane (e.g., referenced to a gravitationally defined "down" vector) may be referred to as Magnetic North. In various embodiments, Magnetic North, a "down" vector, and/or various other directions, positions, and/or fixed or relative reference frames may define an absolute coordinate frame, for example, where directional measurements referenced to an absolute coordinate frame may be referred to as absolute directional measurements (e.g., an "absolute" orientation). In some embodiments, directional measurements may initially be referenced to a coordinate frame of a particular sensor (e.g., a sonar transducer assembly or other module of sonar system 110, and/or user interface 120) and be transformed (e.g., using parameters for one or more coordinate frame transformations) to be referenced to an absolute coordinate frame and/or a coordinate frame of mobile structure 101. In various embodiments, an absolute coordinate frame may be defined and/or correspond to a coordinate frame with one or more undefined axes, such as a horizontal plane local to mobile structure 101 and referenced to a local gravitational vector but with an unreferenced and/or undefined yaw reference (e.g., no reference to Magnetic North).

Sonar system 110 may be implemented as one or more electrically and/or mechanically coupled controllers, transmitters, receivers, transceivers, signal processing logic devices, various electrical components, transducer elements of various shapes and sizes, multichannel transducers/transducer modules, transducer assemblies, assembly brackets, transom brackets, and/or various actuators adapted to adjust orientations of any of the components of sonar system 110, as described herein.

For example, in various embodiments, sonar system 110 may be implemented and/or operated according to any of the systems and methods described in U.S. Provisional Patent Application 62/005,838 filed May 30, 2014 and entitled "MULTICHANNEL SONAR SYSTEMS AND METHODS", and/or U.S. Provisional Patent Application 61/943,170 filed Feb. 21, 2014 and entitled "MODULAR SONAR TRANSDUCER ASSEMBLY SYSTEMS AND METHODS", both of which are hereby incorporated by reference in their entirety. In other embodiments, sonar system 110 may be implemented according to other sonar system arrangements that can be used to detect objects within a water column and/or a floor of a body of water.

More generally, sonar system 110 may be configured to emit one, multiple, or a series of acoustic beams, receive corresponding acoustic returns, and convert the acoustic returns into sonar data and/or imagery, such as bathymetric data, water depth, water temperature, water column/volume debris, bottom profile, and/or other types of sonar data. Sonar system 110 may be configured to provide such data and/or imagery to user interface 120 for display to a user, for example, or to controller 130 for additional processing, as described herein.

In some embodiments, sonar system 110 may be implemented using a compact design, where multiple sonar transducers, sensors, and/or associated processing devices are located within a single transducer assembly housing that is configured to interface with the rest of system 100 through a single cable providing both power and communications to and from sonar system 110. In some embodiments, sonar system 110 may include orientation and/or position sensors configured to help provide two or three dimensional waypoints, increase sonar data and/or imagery quality, and/or provide highly accurate bathymetry data, as described herein.

For example, fisherman desire highly detailed and accurate information and/or imagery of underwater structure and mid water targets (e.g., fish). Conventional sonar systems can be expensive and bulky and typically cannot be used to provide enhanced and/or augmented reality underwater views, as described herein. Embodiments of sonar system 110 include low cost single, dual, and/or multichannel sonar systems that can be configured to produce detailed two and three dimensional sonar data and/or imagery. In some embodiments, sonar system 110 may consolidate electronics and transducers into a single waterproof package to reduce size and costs, for example, and may be implemented with a single connection to other devices of system 100 (e.g., via an Ethernet cable with power over Ethernet, an integral power cable, and/or other communication and/or power transmission conduits integrated into a single interface cable).

In various embodiments, sonar system 110 may be configured to provide many different display views from a variety of selectable perspectives, including down imaging, side imaging, and/or three dimensional imaging, using a selection of configurations and/or processing methods, as described herein. In some embodiments, sonar system 110 may be implemented with a single transducer assembly housing incorporating one or two transducers and/or associated electronics. In other embodiments, sonar system 110 may be implemented with a transducer assembly housing incorporating a multichannel transducer and/or associated electronics. In such embodiments, sonar system 110 may be configured to transmit acoustic beams using a transmission channel and/or element of a multichannel transducer, receive acoustic returns using multiple receive channels and/or elements of the multichannel transducer, and to perform beamforming and/or interferometry processing on the acoustic returns to produce two and/or three dimensional sonar imagery. In some embodiments, one or more sonar transmitters of sonar system 110 may be configured to use CHIRP transmissions to improve range resolution and hence reduce ambiguities typically inherent in interferometry processing techniques.

In various embodiments, mobile structure 101 may include systems such as AHRS 140, gyroscope/accelerometer 144, and/or GNSS 146 that may determine (e.g., measure and/or provide) positioning, heading, acceleration, velocity, jerk, orientation, and/or other such data associated with mobile structure 101. Readings from such sensors may be used to correct for movement of mobile structure 101 (e.g., via bobbing and/or bumps received) when utilizing one or more modules of mobile structure 101. For example, readings of sonar system 110 may use such data to improve alignment of corresponding acoustic returns/samples, for example, and/or to generate imagery based on the measured orientations and/or positions of the transducer assembly. In other embodiments, an external orientation and/or position sensor can be used alone or in combination with an integrated sensor or sensors.

In embodiments where sonar system 110 is implemented with a position sensor, sonar system 110 may be configured to provide a variety of sonar data and/or imagery enhancements. For example, sonar system 110 may be configured to provide accurate positioning of sonar data and/or user-defined waypoints remote from mobile system 101. Similarly, sonar system 110 may be configured to provide accurate two and/or three dimensional aggregation and/or display of a series of sonar data; without position data, a sonar system typically assumes a straight track, which can cause image artifacts and/or other inaccuracies in corresponding sonar data and/or imagery. Additionally, when implemented with a position sensor and/or interfaced with a remote but relatively fixed position sensor (e.g., GNSS 146), sonar system 110 may be configured to generate accurate and detailed bathymetric views of a floor of a body of water.

In embodiments where sonar system 110 is implemented with an OPS, sonar system 110 may be configured to store such location/position information along with other sensor information (acoustic returns, temperature measurements, text descriptions, water depth, attitude, mobile structure speed, and/or other sensor and/or control information) available to system 100. In some embodiments, controller 130 may be configured to generate a look up table so that a user can select desired configurations of sonar system 110 for a particular location or to coordinate with some other sensor information. Alternatively, an automated adjustment algorithm can be used to select optimum configurations based on the sensor information.

For example, in one embodiment, mobile structure 101 may be located in an area identified on a chart using position data, a user may have selected a user setting for a configuration of sonar system 110, and controller 130 may be configured to control an actuator and/or otherwise implement the configuration for sonar system 110 (e.g., to set a particular orientation). In still another embodiment, controller 130 may be configured to receive orientation measurements for mobile structure 101. In such an embodiment, controller 130 may be configured to control the actuators associated with the transducer assembly to maintain its orientation relative to, for example, mobile structure 101 and/or the water surface, and thus improve the displayed sonar images (e.g., by ensuring consistently oriented acoustic beams and/or proper registration of a series of acoustic returns). In various embodiments, controller 130 may be configured to control steering sensor/actuator 150 and/or propulsion system 170 to adjust a position and/or orientation of mobile structure 101 to help ensure proper registration of a series of acoustic returns, sonar data, and/or sonar imagery.

Although FIG. 1A shows various sensors and/or other components of system 100 separate from sonar system 110, in other embodiments, system 100 may include any one or combination of sensors and components described herein. For example, AHRS 140 may be configured to provide measurements of an absolute and/or relative orientation (e.g., a roll, pitch, and/or yaw) of the mobile structure 101 and/or a component thereof to controller 130 and/or user interface 120

User interface 120 may be implemented as a display, a touch screen, a keyboard, a mouse, a joystick, a knob, a steering wheel, a ship's wheel or helm, a yoke, and/or any other device capable of accepting user input and/or providing feedback to a user. In various embodiments, user interface 120 may be adapted to provide user input (e.g., as a type of signal and/or sensor information) to other devices of system 100, such as controller 130. User interface 120 may also be implemented with one or more logic devices that may be adapted to execute instructions, such as software instructions, implementing any of the various processes and/or methods described herein. For example, user interface 120 may be adapted to form communication links, transmit and/or receive communications (e.g., sensor signals, control signals, sensor information, user input, and/or other information), determine various coordinate frames and/or orientations, determine parameters for one or more coordinate frame transformations, and/or perform coordinate frame transformations, for example, or to perform various other processes and/or methods.

In various embodiments, user interface 120 may be adapted to accept user input, for example, to form a communication link, to select a particular wireless networking protocol and/or parameters for a particular wireless networking protocol and/or wireless link (e.g., a password, an encryption key, a MAC address, a device identification number, a device operation profile, parameters for operation of a device, and/or other parameters), to select a method of processing sensor signals to determine sensor information, to adjust a position and/or orientation of an articulated sensor, and/or to otherwise facilitate operation of system 100 and devices within system 100. Once user interface 120 accepts a user input, the user input may be transmitted to other devices of system 100 over one or more communication links.

In one embodiment, user interface 120 may be adapted to receive a sensor or control signal (e.g., from AHRS 140 and/or steering sensor/actuator 150) over communication links formed by one or more associated logic devices, for example, and display sensor and/or other information corresponding to the received sensor or control signal to a user. In related embodiments, user interface 120 may be adapted to process sensor and/or control signals to determine sensor and/or other information. For example, a sensor signal may include an orientation, an angular velocity, an acceleration, a speed, and/or a position of mobile structure 101. In such embodiment, user interface 120 may be adapted to process the sensor signals to determine sensor information indicating an estimated and/or absolute roll, pitch, and/or yaw (attitude and/or rate), and/or a position or series of positions of mobile structure 101, for example, and display the sensor information as feedback to a user. In one embodiment, user interface 120 may be adapted to display a time series of various sensor information and/or other parameters as part of or overlaid on a graph or map, which may be referenced to a position and/or orientation of mobile structure 101. For example, user interface 120 may be adapted to display a time series of positions, headings, and/or orientations of mobile structure 101 and/or other elements of system 100 (e.g., a transducer assembly and/or module of sonar system 110) overlaid on a geographical map, which may include one or more graphs indicating a corresponding time series of actuator control signals, sensor information, and/or other sensor and/or control signals. Additionally, user interface 120 may also be adapted to display a 2D or 3D integrated model that may combine sensor data from a plurality of sensors.

In some embodiments, user interface 120 may be adapted to accept user input including a user-defined target heading, route, and/or orientation for a transducer module, for example, and to generate control signals for steering sensor/actuator 150 and/or propulsion system 170 to cause mobile structure 101 to move according to the target heading, route, and/or orientation. In further embodiments, user interface 120 may be adapted to accept user input including a user-defined target attitude for an actuated device (e.g., sonar system 110) coupled to mobile structure 101, for example, and to generate control signals for adjusting an orientation of the actuated device according to the target attitude. More generally, user interface 120 may be adapted to display sensor information to a user, for example, and/or to transmit sensor information and/or user input to other user interfaces, sensors, or controllers of system 100, for instance, for display and/or further processing. In one embodiment, user interface 120 may be integrated with one or more sensors (e.g., imaging modules, position and/or orientation sensors, other sensors) and/or be portable (e.g., such as a portable touch display or smart phone, for example, or a wearable user interface) to facilitate user interaction with various systems of mobile structure 101.

Controller 130 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of sonar system 110, steering sensor/actuator 150, mobile structure 101, and/or system 100, for example. Such software instructions may also implement methods for processing sensor signals, determining sensor information, providing user feedback (e.g., through user interface 120), querying devices for operational parameters, selecting operational parameters for devices, or performing any of the various operations described herein (e.g., operations performed by logic devices of various devices of system 100).

In addition, a machine readable medium may be provided for storing non-transitory instructions for loading into and execution by controller 130. In these and other embodiments, controller 130 may be implemented with other components where appropriate, such as volatile memory, non-volatile memory, one or more interfaces, and/or various analog and/or digital components for interfacing with devices of system 100. For example, controller 130 may be adapted to store sensor signals, sensor information, parameters for coordinate frame transformations, calibration parameters, sets of calibration points, and/or other operational parameters, over time, for example, and provide such stored data to a user using user interface 120. In some embodiments, controller 130 may be integrated with one or more user interfaces (e.g., user interface 120), and, in one embodiment, may share a communication module or modules. As noted herein, controller 130 may be adapted to execute one or more control loops for actuated device control, steering control (e.g., using steering sensor/actuator 150) and/or performing other various operations of mobile structure 101 and/or system 100. In some embodiments, a control loop may include processing sensor signals and/or sensor information in order to control one or more operations of mobile structure 101 and/or various elements of system 100.

AHRS 140 may be implemented as one or more of a compass, float, accelerometer, magnetometer, and/or other digital or analog device capable of measuring an orientation of mobile structure 101 (e.g., magnitude and direction of roll, pitch, and/or yaw, relative to one or more reference orientations such as gravitational "down" and/or Magnetic North) and providing such measurements as sensor signals that may be communicated to various devices of system 100. AHRS 140 may, in certain embodiments, be implemented as one or more sensors that may measure an attitude of mobile structure 101 on three axes and output data associated with such measurements to various devices of system 100. In some embodiments, AHRS 140 may be adapted to provide heading measurements for mobile structure 101. In other embodiments, AHRS 140 may be adapted to provide roll, pitch, and/or yaw rates for mobile structure 101 (e.g., using a time series of orientation/attitude measurements). AHRS 140 may be positioned and/or adapted to make orientation measurements in relation to a particular coordinate frame of mobile structure 101, for example.

Speed sensor 142 may be implemented as an electronic pitot tube, metered gear or wheel, water speed sensor, wind speed sensor, a wind velocity sensor (e.g., direction and magnitude) and/or other device capable of measuring or determining a linear speed of mobile structure 101 (e.g., in a surrounding medium and/or aligned with a longitudinal axis of mobile structure 101) and providing such measurements as sensor signals that may be communicated to various devices of system 100. In some embodiments, speed sensor 142 may be adapted to provide a velocity of a surrounding medium relative to sensor 142 and/or mobile structure 101.

Gyroscope/accelerometer 144 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of mobile structure 101 and providing such measurements as sensor signals that may be communicated to other devices of system 100 (e.g., user interface 120, controller 130).

Gyroscope/accelerometer 144 may be positioned and/or adapted to make such measurements in relation to a particular coordinate frame of mobile structure 101, for example. In various embodiments, gyroscope/accelerometer 144 may be implemented in a common housing and/or module to ensure a common reference frame or a known transformation between reference frames. Gyroscope/accelerometer 144 may, in certain embodiments, provide data associated with linear and/or angular acceleration and/or velocity detected by gyroscope/accelerometer 144.

GNSS 146 may be implemented according to any global navigation satellite system (GNSS), including a GPS, GLONASS, and/or Galileo based receiver and/or other device capable of determining absolute and/or relative position of mobile structure 101 (e.g., or an element of mobile structure 101 and/or system 100, such as sonar system 110 and/or user interface 120) based on wireless signals received from space-born and/or terrestrial sources (e.g., eLoran, and/or other at least partially terrestrial systems), for example, and capable of providing such measurements as sensor signals that may be communicated to various devices of system 100. In some embodiments, GNSS 146 may be adapted to determine a velocity, speed, and/or yaw rate of mobile structure 101 (e.g., using a time series of position measurements), such as an absolute velocity and/or a yaw component of an angular velocity of mobile structure 101. In various embodiments, one or more logic devices of system 100 may be adapted to determine a calculated speed of mobile structure 101 and/or a computed yaw component of the angular velocity from such sensor information.

Steering sensor/actuator 150 may be adapted to measure and/or physically adjust a heading of mobile structure 101 according to one or more control signals, user inputs, and/or stabilized attitude estimates provided by a logic device of system 100, such as controller 130. Steering sensor/actuator 150 may include one or more actuators and control surfaces (e.g., a rudder or other type of steering or trim mechanism) of mobile structure 101, and may be adapted to physically adjust the control surfaces to a variety of positive and/or negative steering angles/positions.

Propulsion system 170 may be implemented as a propeller, turbine, or other thrust-based propulsion system, a mechanical wheeled and/or tracked propulsion system, a sail-based propulsion system, and/or other types of propulsion systems that can be used to provide motive force to mobile structure 101. In some embodiments, propulsion system 170 may be non-articulated, for example, such that the direction of motive force and/or thrust generated by propulsion system 170 is fixed relative to a coordinate frame of mobile structure 101. Non-limiting examples of non-articulated propulsion systems include, for example, an inboard motor for a watercraft with a fixed thrust vector, for example, or a fixed aircraft propeller or turbine. In other embodiments, propulsion system 170 may be articulated, for example, and may be coupled to and/or integrated with steering sensor/actuator 150, for example, such that the direction of generated motive force and/or thrust is variable relative to a coordinate frame of mobile structure 101. Non-limiting examples of articulated propulsion systems include, for example, an outboard motor for a watercraft, an inboard motor for a watercraft with a variable thrust vector/port (e.g., used to steer the watercraft), a sail, or an aircraft propeller or turbine with a variable thrust vector, for example.

Other modules 180 may include other and/or additional sensors, actuators, communications modules/nodes, and/or user interface devices used to provide additional environmental information of mobile structure 101, for example. In some embodiments, other modules 180 may include a humidity sensor, a wind and/or water temperature sensor, a barometer, a radar system, a visible spectrum camera, an infrared camera, lidar systems, a salinity sensor such as a sea surface salinity sensor, and/or other environmental sensors providing measurements and/or other sensor signals that can be displayed to a user and/or used by other devices of system 100 (e.g., controller 130) to provide operational control of mobile structure 101 and/or system 100 that compensates for environmental conditions, such as wind speed and/or direction, swell speed, amplitude, and/or direction, and/or an object in a path of mobile structure 101, for example. In some embodiments, other modules 180 may include one or more actuated devices (e.g., spotlights, infrared and/or visible light illuminators, infrared and/or visible light cameras, radars, sonars, lidar systems, and/or other actuated devices) coupled to mobile structure 101, where each actuated device includes one or more actuators adapted to adjust an orientation of the device, relative to mobile structure 101, in response to one or more control signals (e.g., provided by controller 130). Additionally, other modules 180 may also include orientation and/or position sensors associated with sensors of the other modules 180. The orientation and/or position sensors may be incorporated within the sensors of the other modules 180, or may be separate from the sensors of the other modules 180. Non-limiting example of such orientation and/or position sensors include accelerometers, gyroscopes, magnetometers, and/or other such sensors.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sonar data and/or imagery, for example, or for transmitting and/or receiving communications, such as sensor signals, sensor information, and/or control signals, between one or more devices of system 100. In one embodiment, such method may include instructions to receive an orientation, acceleration, position, and/or speed of mobile structure 101 and/or sonar system 110 from various sensors, to determine a transducer orientation adjustment (e.g., relative to a desired transducer orientation) from the sensor signals, and/or to control an actuator to adjust a transducer orientation accordingly, for example, as described herein. In a further embodiment, such method may include instructions for forming one or more communication links between various devices of system 100.

In addition, one or more machine readable mediums may be provided for storing non-transitory instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Each of the elements of system 100 may be implemented with one or more amplifiers, modulators, phase adjusters, beamforming components, digital to analog converters (DACs), analog to digital converters (ADCs), various interfaces, antennas, transducers, and/or other analog and/or digital components enabling each of the devices of system 100 to transmit and/or receive signals, for example, in order to facilitate wired and/or wireless communications between one or more devices of system 100. Such components may be integrated with a corresponding element of system 100, for example. In some embodiments, the same or similar components may be used to perform one or more sensor measurements, as described herein.

For example, the same or similar components may be used to create an acoustic pulse (e.g., a transmission control signal and/or a digital shaping control signal), convert the acoustic pulse to an excitation signal (e.g., a shaped or unshaped transmission signal) and transmit it to a sonar transducer element to produce an acoustic beam, receive an acoustic return (e.g., a sound wave received by the sonar transducer element and/or corresponding electrical signals from the sonar transducer element), convert the acoustic return to acoustic return data, and/or store sensor information, configuration data, and/or other data corresponding to operation of a sonar system, as described herein.

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques.

In some embodiments, various elements or portions of elements of system 100 may be integrated with each other, for example, or may be integrated onto a single printed circuit board (PCB) to reduce system complexity, manufacturing costs, power requirements, and/or timing errors between the various sensor measurements. For example, gyroscope/accelerometer 144, user interface 120, and controller 130 may be configured to share one or more components, such as a memory, a logic device, a communications module, and/or other components, and such sharing may act to reduce and/or substantially eliminate such timing errors while reducing overall system complexity and/or cost.

Each element of system 100 may include one or more batteries or other electrical power storage devices, for example, and may include one or more solar cells or other electrical power generating devices (e.g., a wind or water-powered turbine, or a generator producing electrical power from motion of one or more elements of system 100). In some embodiments, one or more of the devices may be powered by a power source for mobile structure 101, using one or more power leads. Such power leads may also be used to support one or more communication techniques between elements of system 100.

In various embodiments, a logic device of system 100 (e.g., of AHRS 140 and/or other elements of system 100) may be adapted to determine parameters (e.g., using signals from various devices of system 100) for transforming a coordinate frame of sonar system 110 and/or other sensors of system 100 to/from a coordinate frame of mobile structure 101, at-rest and/or in-motion, and/or other coordinate frames, as described herein. One or more logic devices of system 100 may be adapted to use such parameters to transform a coordinate frame of sonar system 110, gyroscope/accelerometer 144, other modules 180, and/or other sensors of system 100 to/from a coordinate frame of AHRS 140 and/or mobile structure 101, for example. Furthermore, such parameters may be used to determine and/or calculate one or more adjustments to an orientation of sonar system 110, gyroscope/accelerometer 144, other modules 180, and/or other sensors of system 100 that would be necessary to physically align a coordinate frame of sonar system 110, gyroscope/accelerometer 144, other modules 180, and/or other sensors of system 100 with a coordinate frame of AHRS 140 and/or mobile structure 101, for example, or an absolute coordinate frame. Adjustments determined from such parameters may be used to selectively power adjustment servos/actuators (e.g., of sonar system 110 and/or other sensors or elements of system 100), for example, or may be communicated to a user through user interface 120, as described herein.

Figure 1B:
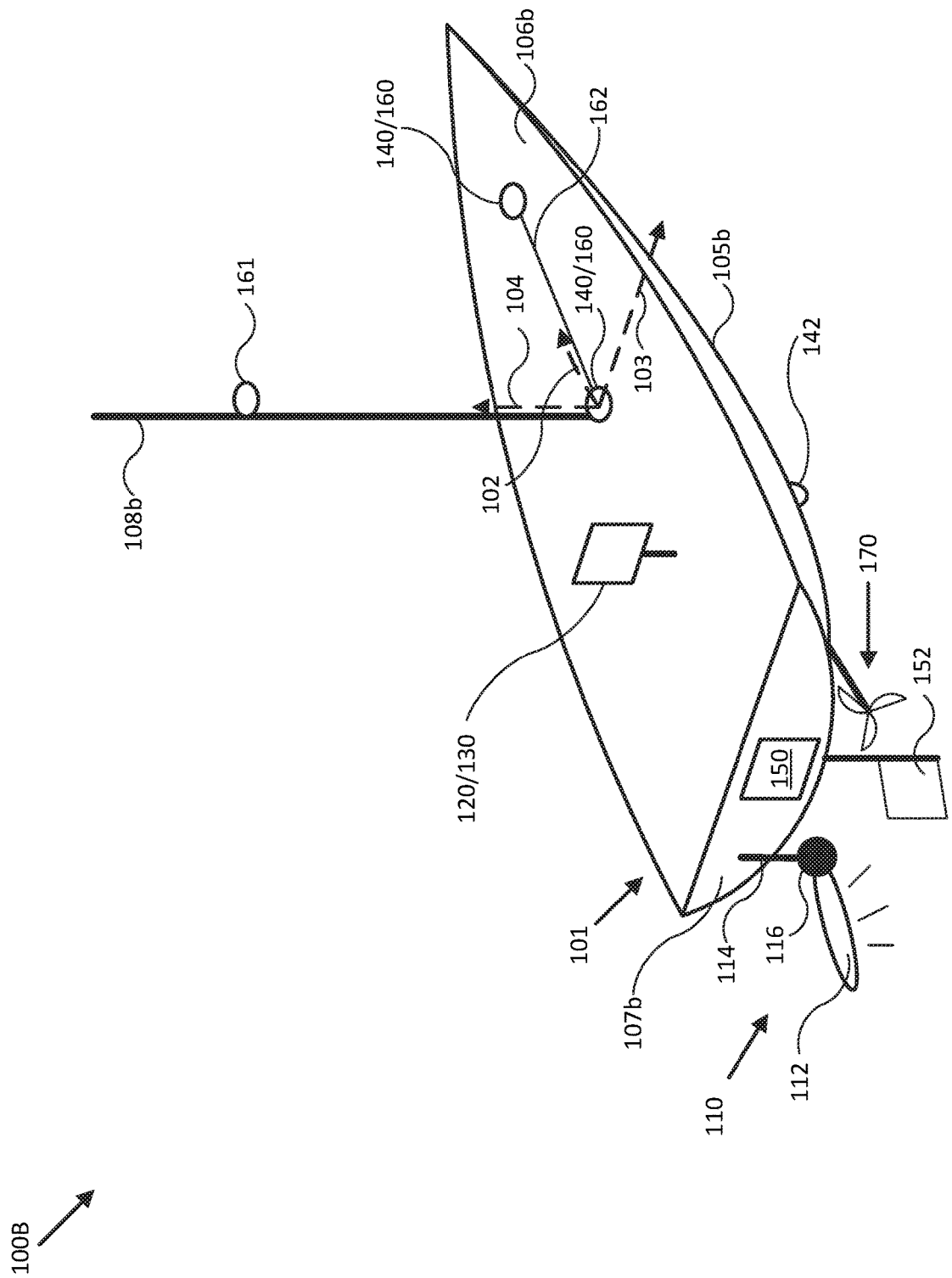
FIG. 1B illustrates a diagram of a mobile structure in accordance with an embodiment of the disclosure.

FIG. 1B illustrates a diagram of a mobile structure in accordance with an embodiment of the disclosure. In the embodiment shown in FIG. 1B, system 100B may include sonar system 110, integrated user interface/controller 120/130, secondary user interface 120, steering sensor/actuator 150, AHRS 140/sensor cluster 160 (e.g., gyroscope/accelerometer 144, GNSS 146, and/or other modules 180 such as radar systems), imager cluster 161, and various other sensors and/or actuators. In the embodiment illustrated by FIG. 1B, mobile structure 101 is implemented as a motorized boat including a hull 105b, a deck 106b, a transom 107b, a mast/sensor mount 108b, a rudder 152, an inboard motor 170, and an actuated sonar system 110 coupled to transom 107b. In other embodiments, hull 105b, deck 106b, mast/sensor mount 108b, rudder 152, inboard motor 170, and various actuated devices may correspond to attributes of a passenger aircraft or other type of vehicle, robot, or drone, for example, such as an undercarriage, a passenger compartment, an engine/engine compartment, a trunk, a roof, a steering mechanism, a headlight, a radar system, and/or other portions of a vehicle.

As depicted in FIG. 1B, mobile structure 101 includes actuated sonar system 110, which in turn includes transducer assembly 112 coupled to transom 107b of mobile structure 101 through assembly bracket/actuator 116 and transom bracket/electrical conduit 114. In some embodiments, assembly bracket/actuator 116 may be implemented as a roll, pitch, and/or yaw actuator, for example, and may be adapted to adjust an orientation of transducer assembly 112 according to control signals and/or an orientation (e.g., roll, pitch, and/or yaw) or position of mobile structure 101 provided by user interface/controller 120/130. For example, user interface/controller 120/130 may be adapted to receive an orientation of transducer assembly 112 configured to ensonify a portion of surrounding water and/or a direction referenced to an absolute coordinate frame, and to adjust an orientation of transducer assembly 112 to retain ensonification of the portion and/or direction in response to motion of mobile structure 101, using one or more orientations and/or positions of mobile structure 101 and/or other sensor information derived by executing various methods described herein.

In another embodiment, user interface/controller 120/130 may be configured to adjust an orientation of transducer assembly 112 to direct sonar transmissions from transducer assembly 112 substantially downwards and/or along an underwater track during motion of mobile structure 101. In such embodiment, the underwater track may be predetermined, for example, or may be determined based on criteria parameters, such as a minimum allowable depth, a maximum ensonified depth, a bathymetric route, and/or other criteria parameters. Transducer assembly 112 may be implemented with a sonar orientation and/or position sensor (OPS), which may include one or more sensors corresponding to AHRS 140, gyroscope/accelerometer 144 and/or GNSS 146, for example, that is configured to provide absolute and/or relative positions and/or orientations of transducer assembly 112 to facilitate actuated orientation of transducer assembly 112.

In one embodiment, user interfaces 120 may be mounted to mobile structure 101 substantially on deck 106b and/or mast/sensor mount 108b. Such mounts may be fixed, for example, or may include gimbals and other leveling mechanisms/actuators so that a display of user interfaces 120 can stay substantially level with respect to a horizon and/or a "down" vector (e.g., to mimic typical user head motion/orientation), for example, or so the display can be oriented according to a user's desired view. In another embodiment, at least one of user interfaces 120 may be located in proximity to mobile structure 101 and be mobile/portable throughout a user level (e.g., deck 106b) of mobile structure 101. For example, a secondary user interface 120 may be implemented with a lanyard, strap, headband, and/or other type of user attachment device and be physically coupled to a user of mobile structure 101 so as to be in proximity to the user and mobile structure 101. Other embodiments of the user interface 120 may include a portable device that is not physically coupled to the user and/or mobile structure 101. In various embodiments, user interface 120 may be implemented with a relatively thin display that is integrated into a PCB or other electronics of the corresponding device or structure in order to reduce size, weight, housing complexity, and/or manufacturing costs.

As shown in FIG. 1B, in some embodiments, speed sensor 142 may be mounted to a portion of mobile structure 101, such as to hull 105b, and be adapted to measure a relative water speed. In some embodiments, speed sensor 142 may be adapted to provide a thin profile to reduce and/or avoid water drag. In various embodiments, speed sensor 142 may be mounted to a portion of mobile structure 101 that is substantially outside easy operational accessibility. Speed sensor 142 may include one or more batteries and/or other electrical power storage devices, for example, and may include one or more water-powered turbines to generate electrical power. In other embodiments, speed sensor 142 may be powered by a power source for mobile structure 101, for example, using one or more power leads penetrating hull 105b. In alternative embodiments, speed sensor 142 may be implemented as a wind velocity sensor, for example, and may be mounted to mast/sensor mount 108b to have relatively clear access to local wind.

In the embodiment illustrated by FIG. 1B, mobile structure 101 includes direction/longitudinal axis 102, direction/lateral axis 103, and direction/vertical axis 104 meeting approximately at mast/sensor mount 108b (e.g., near a center of gravity of mobile structure 101). In one embodiment, the various axes may define a coordinate frame of mobile structure 101 and/or sensor cluster 160.

Each sensor adapted to measure a direction (e.g., velocities, accelerations, headings, or other states including a directional component) may be implemented with a mount, actuators, and/or servos that can be used to align a coordinate frame of the sensor with a coordinate frame of any element of system 100B and/or mobile structure 101. Each element of system 100B may be located at positions different from those depicted in FIG. 1B. Each device of system 100B may include one or more batteries or other electrical power storage devices, for example, and may include one or more solar cells or other electrical power generating devices. In some embodiments, one or more of the devices may be powered by a power source for mobile structure 101. As rioted herein, each element of system 100B may be implemented with an antenna, a logic device, and/or other analog and/or digital components enabling that element to provide, receive, and process sensor signals and interface or communicate with one or more devices of system 100B. Further, a logic device of that element may be adapted to perform any of the methods described herein.

In certain embodiments, mobile structure 101 may include one or more AHRS 140 and/or one more sensor cluster 160 (e.g., gyroscope/accelerometer 144, GNSS 146, and/or other modules 180, including radar and/or other sensor systems). Such one or more AHRS 140/sensor cluster 160 may be communicatively coupled via, for example, communications link 162. Transmission of data through communications link 162 may be subject to latency.

Figure 2:
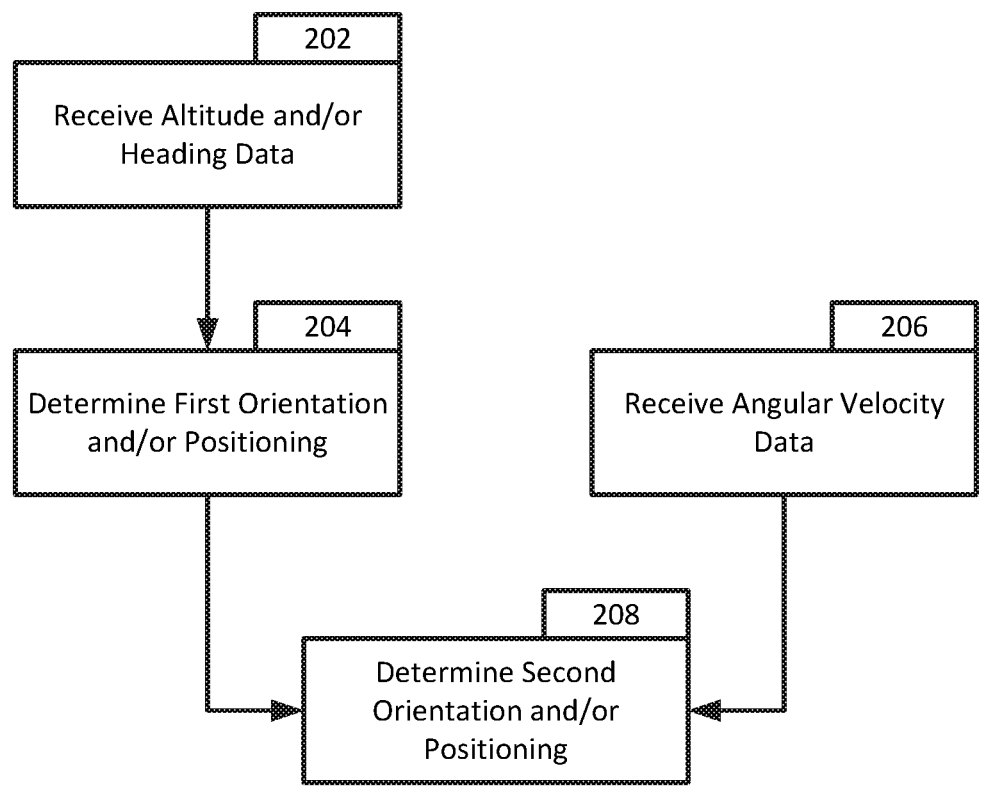
FIG. 2 illustrates a flowchart of a process for removing bus latency of an AHRS equipped system in accordance with an embodiment of the disclosure.

FIG. 2 illustrates a flowchart of a process for removing bus latency of an AHRS equipped system in accordance with an embodiment of the disclosure. The technique disclosed here, in FIGS. 2 and 3, may be performed by one or more logic devices associated with corresponding electronic devices, sensors, and/or structures depicted in FIGS. 1A, 1B, and 5 and may include multiple networked devices and/or modules with a single main AHRS of the mobile structure. The main AHRS may communicate attitude and/or heading information to the multiple networked devices. In certain embodiments, communication of such information may include network latency. As such, one or more of the network devices may include, for example, a slave AHRS such as a gyroscope configured to compensate for such latency.

More generally, the operations described herein may be implemented with any combination of software instructions and/or electronic hardware (e.g., inductors, capacitors, amplifiers, actuators, antennas, phase adjustors, amplifiers, or other analog and/or digital components). It should be appreciated that any step, sub-step, sub-process, or block of the processes described herein may be performed in an order or arrangement different from the embodiments illustrated. For example, in other embodiments, one or more blocks may be omitted, and/or other blocks may be included. Furthermore, block inputs, block outputs, various sensor signals, sensor information, calibration parameters, and/or other operational parameters may be stored to one or more memories prior to moving to a following portion of any of the processes described herein. The processes described herein may be performed by other systems and including a different selection of electronic devices, sensors, assemblies, and/or sensor arrangements than that described herein. At the initiation of the processes described herein, various system parameters may be populated by prior execution of a process similar to the processes described, for example, or may be initialized to zero and/or one or more values corresponding to typical, stored, and/or learned values derived from past operation of such processes, as described herein.

In block 202, the one or more devices, a controller, and/or other such device may receive attitude and/or heading data from the AHRS. The attitude and/or heading data may be communicated through a network from the AHRS to the one or more devices prior to moving to block 204. As such, there may be latency (e.g., which may be variable from measurement to measurement) in the communication of the AHRS data.

In block 204, a first orientation and/or position may be determined from the attitude and/or heading data of the AHRS. In certain embodiments, the first orientation and/or position may only be determined initially (e.g., at the beginning of a calibration process, a drive cycle, a process for determining an orientation and/or position of the device, and/or at the beginning of another such cycle) while in other embodiments, the orientation and/or position may be determined periodically, constantly, and/or in a plurality of instances.

In certain embodiments, as the mobile structure may be a rigid body, changes in heading, movement (e.g., acceleration, velocity, jerk, and/or other changes), and/or attitude of the mobile structure may be transferred/reflected by the devices. That is, if the mobile structure were to change in heading, movement, and/or attitude, a device that is coupled to the mobile structure may also change in movement and/or attitude.

In block 206, data from a gyroscope and/or another such slave AHRS (e.g., an accelerometer, magnetometer, and/or other such device) may be received by, for example, the one or more devices, a controller, and/or other such device. As such a gyroscope and/or slave AHRS may be coupled to the device, receiving data from such a source may not include latency and/or may include only minimal and/or repeatable/known amounts of latency. As such, such data may allow the device to much more quickly determine any changes in heading, movement, and/or attitude of the mobile structure. Such data may include, for example, angular velocity and/or acceleration data associated with the device. The data may be received and/or stored prior to moving to block 208.

Such data, along with additional attitude and/or heading data, may be processed in block 208 to determine a second orientation and/or position (e.g., an updated orientation and/or position, a later in time orientation and/or position, a corrected orientation and/or position, and/or another such second orientation and/or position). The second orientation and/or position may reflect changes in movement, heading, and/or attitude of the mobile structure that may not be reflected in data from the AHRS (e.g., provided by blocks 202 and/or 204) due to latency.

Figure 3:
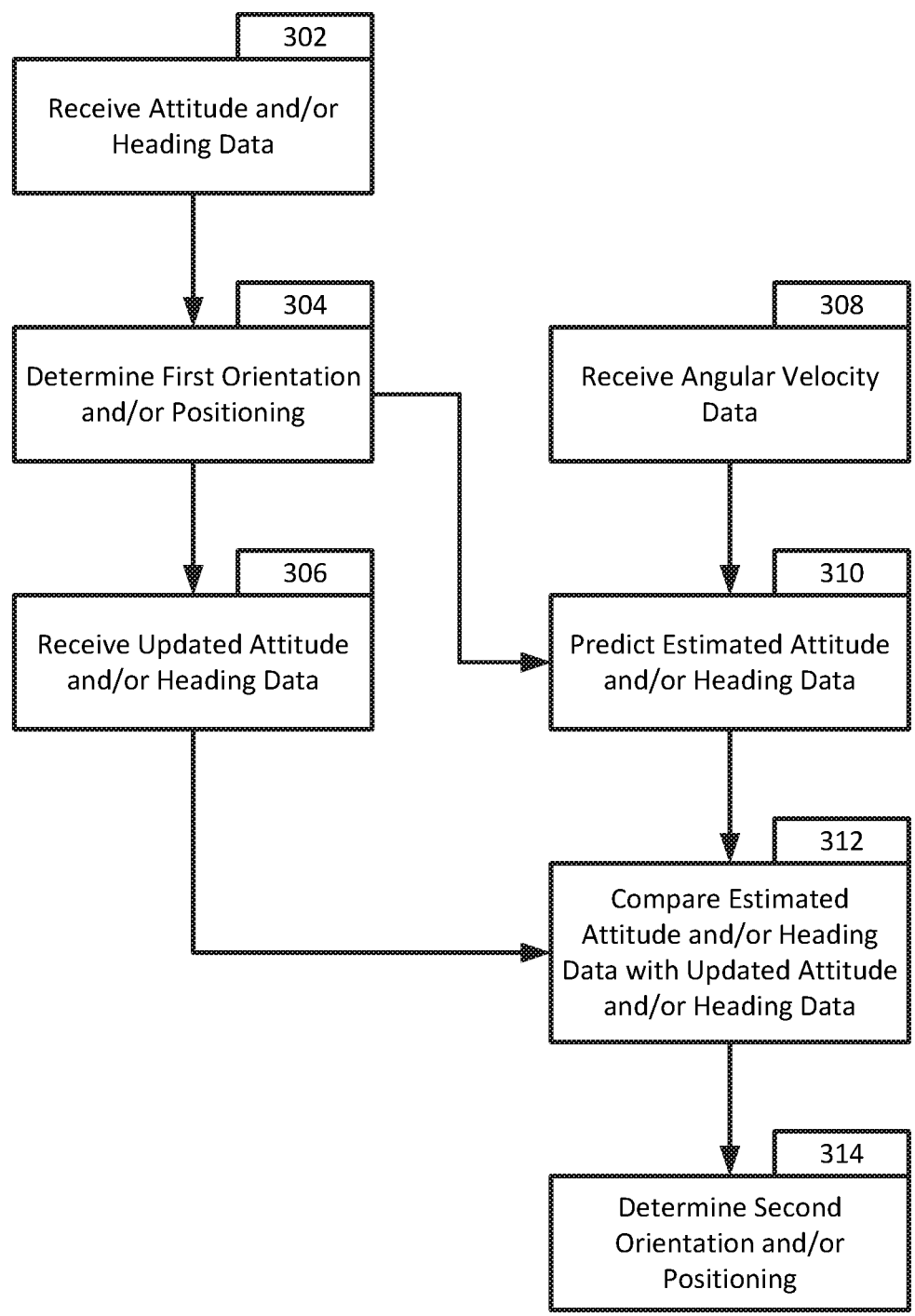
FIG. 3 illustrates another flowchart of a process for removing bus latency of an AHRS equipped system in accordance with an embodiment of the disclosure.

FIG. 3 illustrates another flowchart of a process for removing bus latency of an AHRS equipped system in accordance with an embodiment of the disclosure. FIG. 3 may describe an embodiment of the process of FIG. 2.

In block 302, attitude and/or heading data may be received from the AHRS (e.g., similar to block 202 of FIG. 2) prior to moving to block 304. In block 304, a first orientation and/or position (e.g., an "AHRS orientation") may be determined, similar to block 204 of FIG. 2, prior to moving to blocks 306 and 310. In block 308, data from a gyroscope and/or another slave AHRS (e.g., an accelerometer, magnetometer, and/or other such device) may be received by, for example, the one or more devices, a controller, and/or other such device, similar to block 206 of FIG. 2, prior to moving to block 310.

In block 310, estimated attitude and/or heading data (e.g., a "slave orientation") may be predicted/estimated from data received in block 308. The estimated attitude and/or heading data may be predicted/estimated from, for example, data from a gyroscope and/or slave AHRS associated with the device. For example, any changes in attitude and/or heading detected by such a gyroscope and/or slave AHRS may be used to predict changes in attitude and/or heading of the mobile structure. As such, the estimated attitude and/or heading may predict changes in attitude and/or heading of the mobile structure before updated attitude and/or heading data from the AHRS has been communicated to (e.g., transmitted to and/or received by) the device. In certain embodiments, the estimated attitude and/or heading data may be determined (e.g., according to a process or algorithm) based on sensor data from the gyroscope and/or slave AHRS, prior to moving to block 312.

In block 306, updated attitude and/or heading data may be received from the primary or master AHRS, prior to moving to block 312. Updated attitude and/or heading data may be data received at a second point in time and/or period of time subsequent from that of data received in block 302. The updated attitude and/or heading data may reflect changes in attitude and/or heading of the mobile structure.

In block 312, the updated attitude and/or heading received from the AHRS in block 306 may be compared to the estimated attitude and/or heading predicted in block 310. In certain embodiments, primarily due to latency, where the updated attitude and/or heading data provided in block 306 may be received in a period of time after the mobile structure has experienced subsequent changes in attitude and/or heading (e.g., subsequent to the measurement of the updated data received in block 306), the comparison may reflect a difference in predicted attitude and/or heading to actual attitude and/or heading at a previous point in time.

In block 314, a second orientation and/or position may be determined based on the estimated attitude and/or heading, the updated attitude and/or heading, and/or the comparison between estimated attitude and/or heading and the updated attitude and/or heading. For example, the second orientation and/or position may be determined from a combination of attitude and/or heading determined in blocks 306, 310, and/or 312. Alternatively and/or additionally, responsive to the comparison in block 312, the algorithm to determine the estimated attitude and/or heading may be updated according to the comparison.

Figure 8:
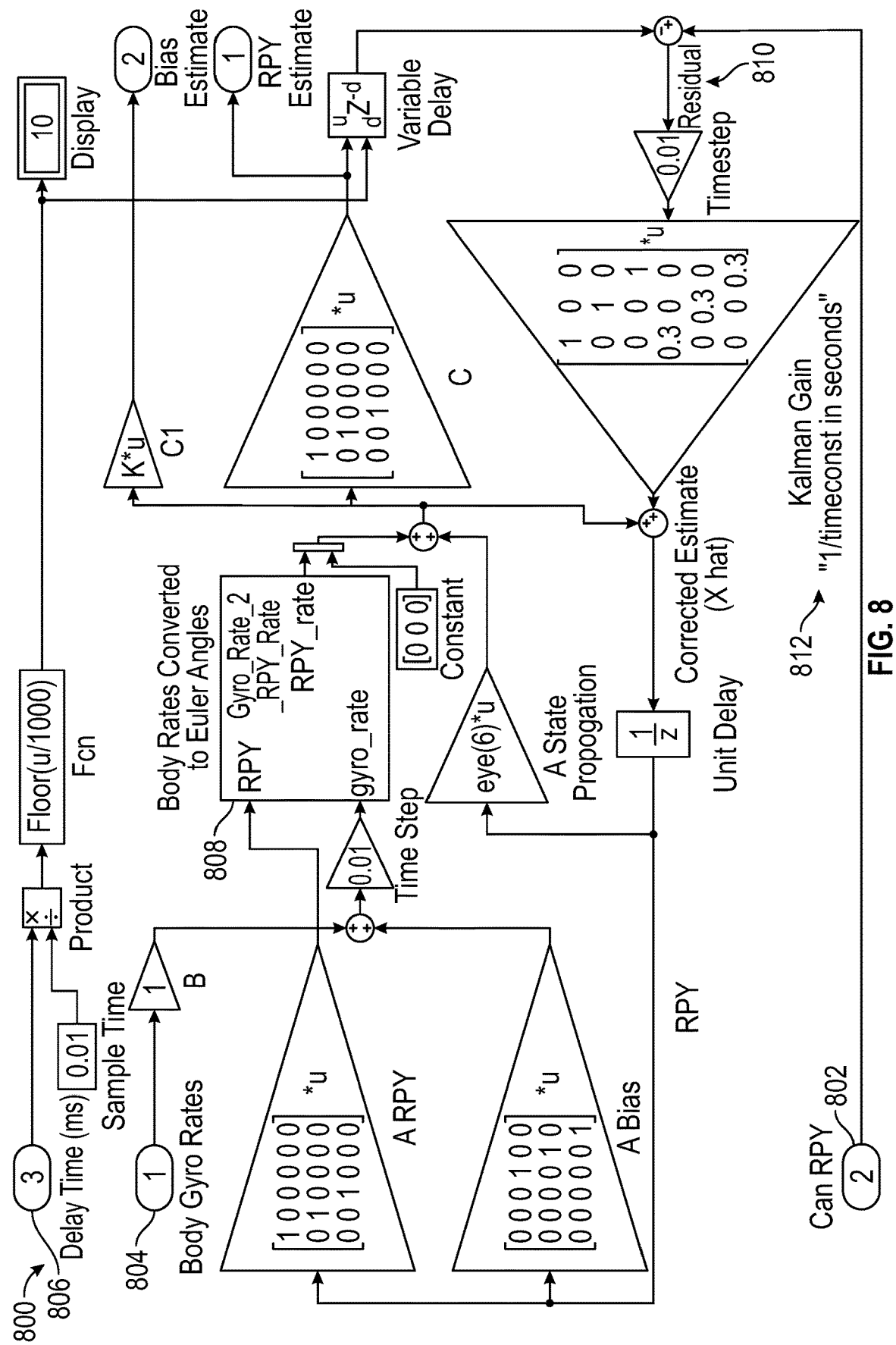
FIGS. 8-12 illustrate system diagrams for performing the processes described herein in accordance with an embodiment of the disclosure.
Figure 9:
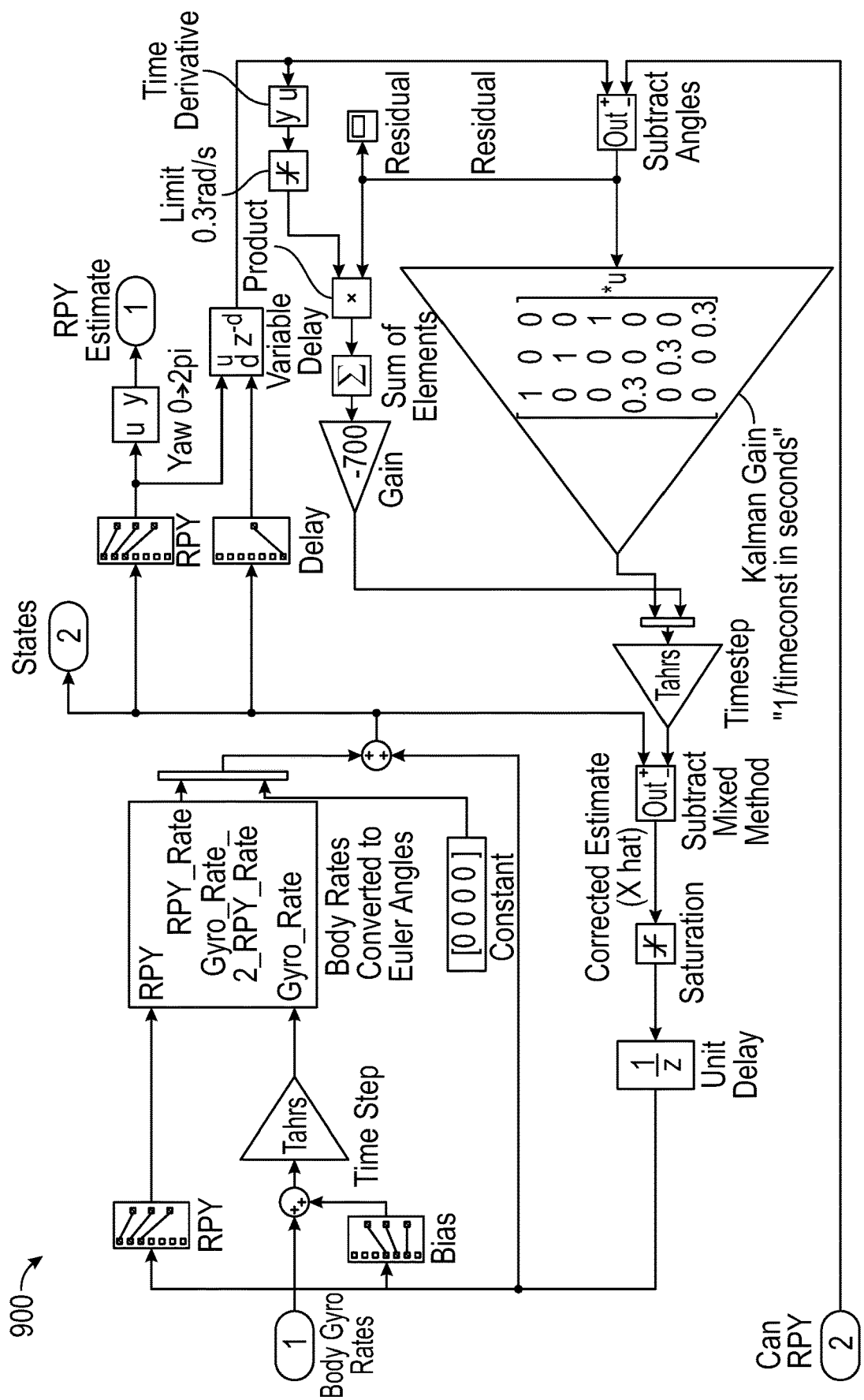
Figure 10:
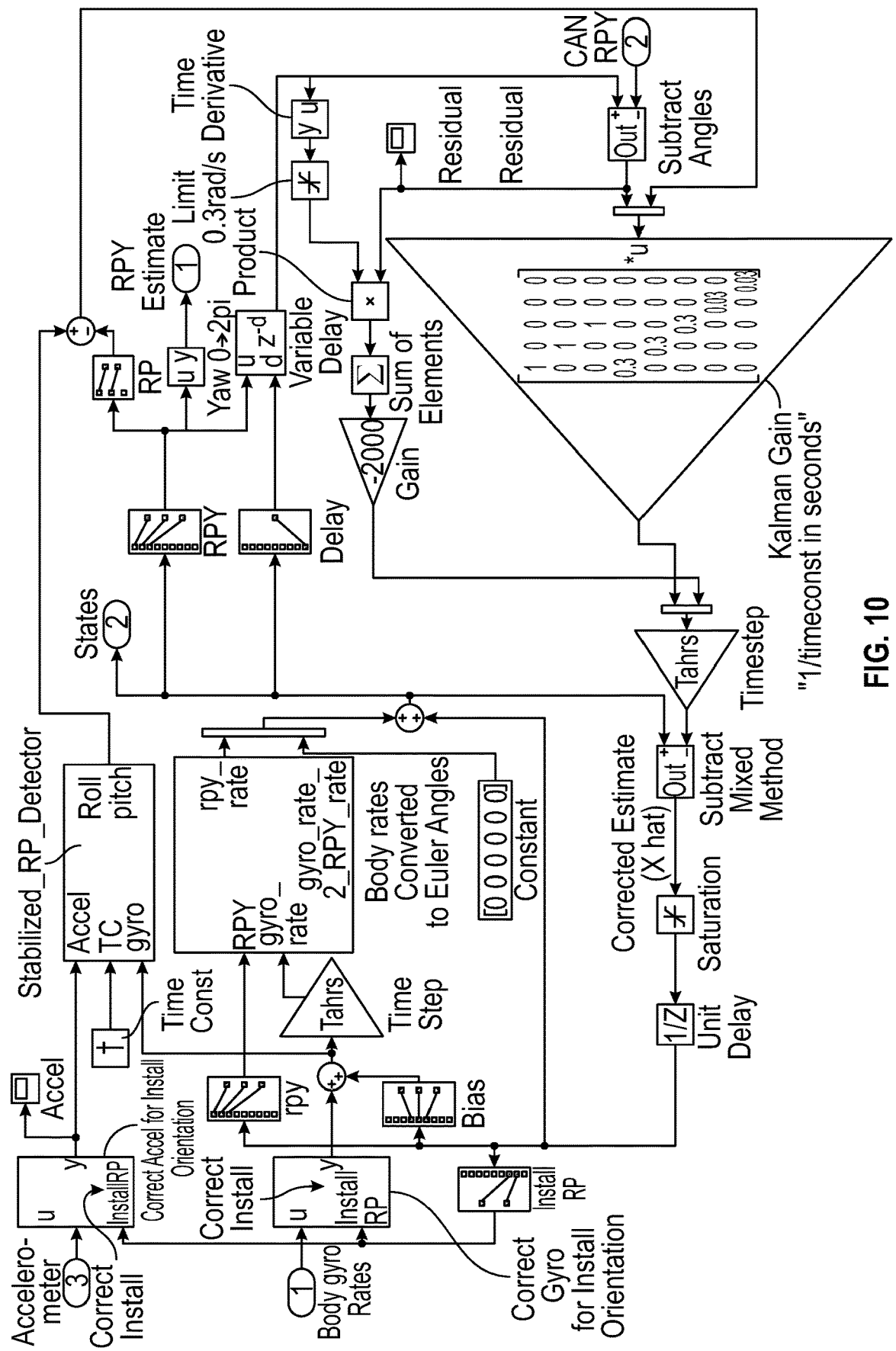

In some embodiments, blocks 310, 312, and/or 314 may be implemented in a control loop including a Kalman filter arrangement, as described herein at least with respect to FIGS. 8-10. For example, in various embodiments, the Kalman filter may be configured to operate according to at least six states: the first three states may be RPY estimates (e.g., roll, pitch, and yaw estimates derived from gyroscope data and/or relatively delayed AHRS RPY data), and the fourth through sixth states may be gyroscope x, y, and z bias estimates (e.g., used to compensate for long term drift in the gyroscope data, relative to an actual RPY of mobile structure 101). In some embodiments, gyroscope rates provided by the slave AHRS may be converted from body RPY rates to Euler RPY rates. A Euler RPY angle estimate may be generated from integration of the gyroscope (e.g., Euler) RPY rates and a fine-tune term (e.g., a residual) multiplied by a gain associated with the Kalman filter. Such residual may be calculated as the error/difference between the RPY estimate and the most recent RPY measurement from the master AHRS, after time shifting the RPY estimate (e.g., by the mean latency associated with delivery of the RPY measurements from the master AHRS) for temporal matching of the RPY estimate with the master AHRS measurements.

In certain embodiments, such time delay may be unknown and/or variable due to network timing instabilities. As such, the delay may be an additional seventh state (e.g., the delay may also be an estimate). Changes in the estimate of the delay may be derived from the product of the residual and the RPY estimate, as shown in FIG. 9, and such estimates may be applied to all three of the RPY signals and/or multiplied by a gain before being fed back through the Kalman filter arrangement. Additional embodiments may include further states. For example, such embodiments may include secondary sensors that may include further unknowns, and such further unknowns may be estimated by additional states integrated within the Kalman filter arrangement. FIGS. 8-10 may further illustrate such Kalman filter arrangements, as described herein.

In certain situations, mobile structure 101 may be partially or fully sail powered, such as a sailboat. As such, determination of wind characteristics (e.g., wind direction, wind strength, and/or changes thereof) may be useful in operating the mobile structure. Typically, wind direction and/or strength may change rapidly, and quick and accurate determination of such changes aids in the operation of such mobile structure.

Figure 4:
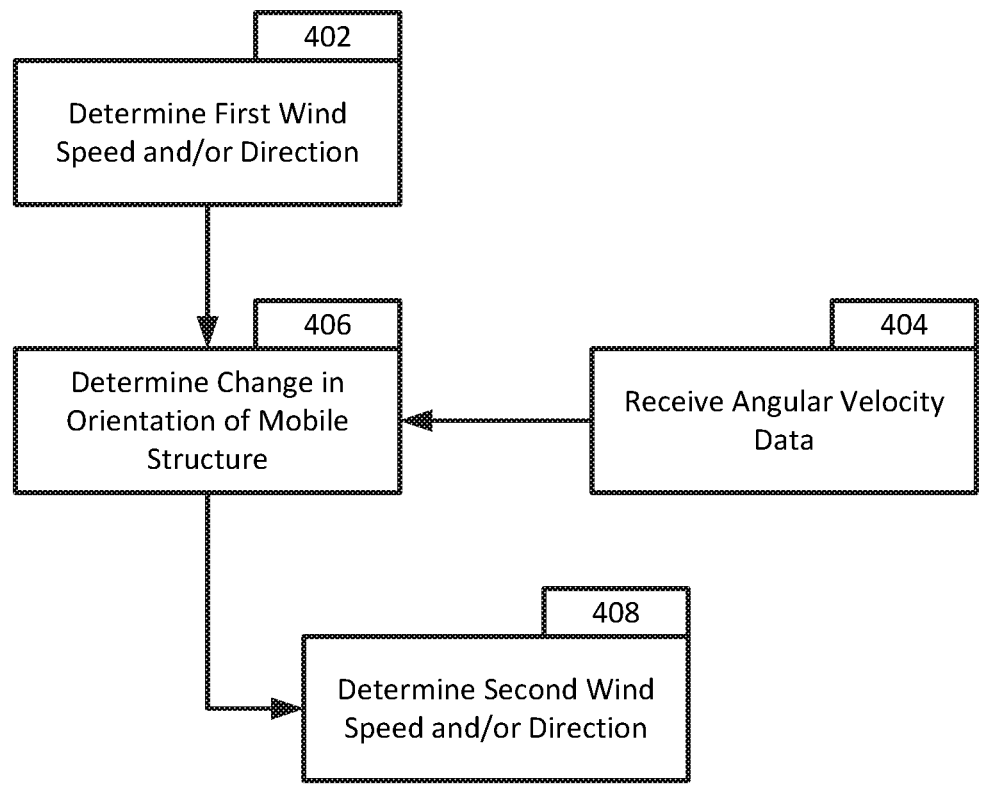
FIG. 4 illustrates a flowchart of a process for determining wind characteristics on a moving mobile structure in accordance with an embodiment of the disclosure.

FIG. 4 illustrates a flowchart of a process for determining wind characteristics on a moving mobile structure in accordance with an embodiment of the disclosure. In block 402, an initial and/or first wind speed and/or direction may be determined. The first wind speed and/or direction may be determined from, for example, instruments such as one or more anemometers, accelerometers, gyroscopes, and/or other such devices, prior to moving to block 406.

In block 404, data may be received from the gyroscope and/or slave AHRS (e.g., which may be integrated with the wind speed/direction sensor), prior to moving to block 406. Such data may indicate changes in heading and/or attitude of the mobile structure, which may be determined in block 406. Such changes in heading and/or attitude may be indicate changes in wind direction and/or wind speed (e.g., a 10 degree change in heading to starboard of the mobile structure may indicate a change in wind direction, such as a 10 degree change to port in wind direction). In certain embodiments, data may also be received pertaining to a configuration of the mobile structure. Such configuration data (e.g., any changes in sail configuration, rudder angle, weight distribution of the mobile structure, and other changes) may also be used to determine changes in wind direction and/or wind speed.

The change in wind direction and/or wind speed may be determined in block 408. Such change in wind direction and/or wind speed may be determined from the gyroscope data, data indicating changes in orientation, heading, and/or attitude of the mobile structure, data indicating changes in configuration of the mobile structure, and/or other such data.

As such, in certain embodiments, the estimated wind direction and/or velocity may be calculated by, for example, determining a movement vector of the mobile structure and adjusting the estimated wind direction and/or velocity responsive to the movement vector.

Certain embodiments may include an anemometer. The anemometer may include a vane and a cup. The anemometer may be optimized for response time. For example, the balance weight of the vane may be shortened to reduce its moment of inertia. Additionally, the weight of the cups may be minimized, especially towards the tips, to increase the response rate of the cups. In certain such embodiments, sampling rates may be optimized. For example, the sampling rate may be faster than the natural frequency of the mobile structure (to minimize error due to the natural frequency). In certain such embodiments, the sampling rate may be, for example, 1 to 8 Hertz.

Figure 5:
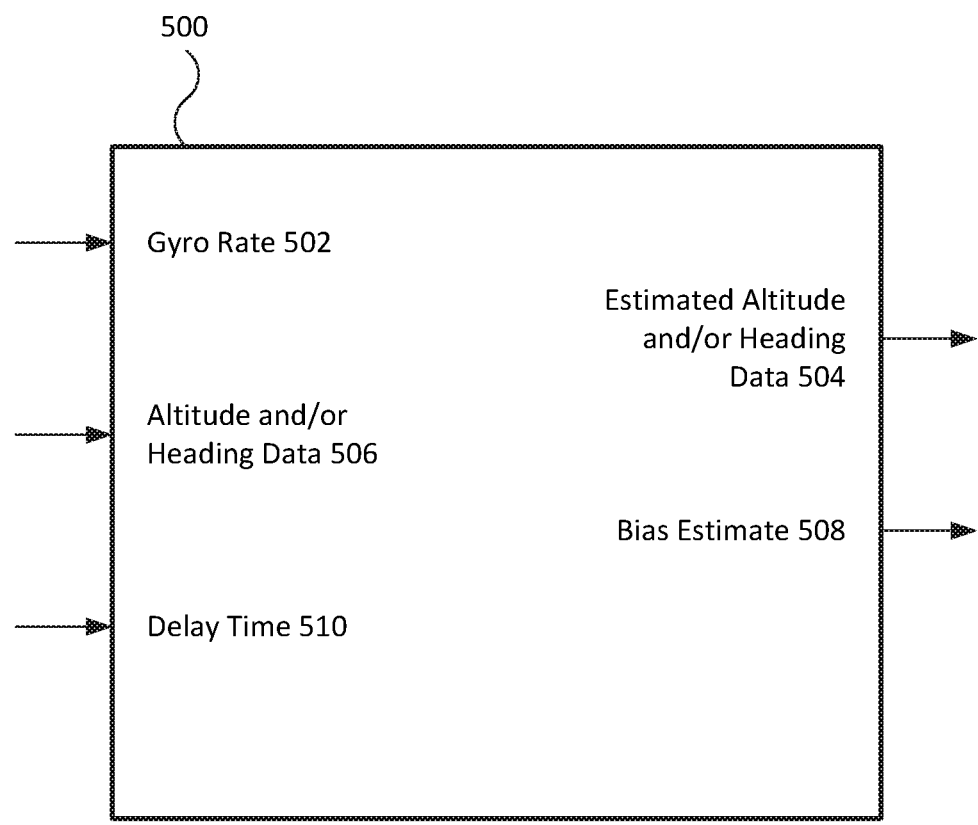
FIG. 5 illustrates a diagram of a system for removing bus latency of an AHRS equipped system in accordance with an embodiment of the disclosure.

FIG. 5 illustrates a diagram of top level view of a system and/or process for removing bus latency of an AHRS equipped system in accordance with an embodiment of the disclosure. FIG. 5 illustrates a system and/or process that may obtain inputs and output estimates based on the inputs. For example, in some embodiments, system 500 may be configured to receive gyroscope rate 502 (e.g., from a slave AHRS), attitude and/or heading data 506 (e.g., roll, pitch, and/or yaw data as well as other data associated with attitude and/or heading of mobile structure 101, from a primary/master AHRS), and/or delay time 510 (e.g., corresponding to a latency associated with the primary AHRS and/or corresponding network transmissions) as inputs and output an estimated attitude and/or heading data 504 (e.g., a roll, pitch, and yaw estimate). System 500 may also be configured to determine a bias estimate 508 (e.g., a drift estimate) associated the gyroscope/gyroscope rate 502 from such data.

Delay time 510 (e.g., a latency) of the AHRS may be received and/or determined within system 500, such as when delay time 510 is variable and/or unknown. In such embodiments, delay time 500 may be estimated as an additional state, as described herein. In certain such embodiments, estimation of the delay may change over time. In general, the driver of changes in the delay estimation is derived from the product of the residual (e.g., the difference between the RPY estimate and the AHRS RPY, after time shifting the estimate by the mean transport delay in order to temporally match the RPY estimate with the actual time of the AHRS RPY) and the RPY estimate, the sign of which propagates the correct change in the delay estimate as the control loop iterates.

For example, a relatively small delay estimate may result in the RPY estimate being ahead of when the master AHRS RPY data is received. In this small-delay estimate case, when turning to in a positive sense, the residual will be positive, and when turning in a negative direction, the residual will be negative, and so the product will always be positive. By contrast, a relatively large delay estimate may result in the RPY estimate lagging behind when the master AHRS RPY data is received. In this large-delay estimate case, when turning to in a positive sense, the residual will be negative, and when turning in a negative direction, the residual will be positive, and so the product will always be negative. Therefore, the direction of the fine tuning parameter may be determined by the product. This may apply for all three RPY signals, and each signal contributes equally on the same scale, so the three signals may be added together to form a total driving signal. The total driving signal (e.g., to drive changes in the delay estimate) may be multiplied by a gain term to exchange responsiveness of the control loop with noise in the RPY and gyroscope bias estimates, as described herein.

Figure 6:
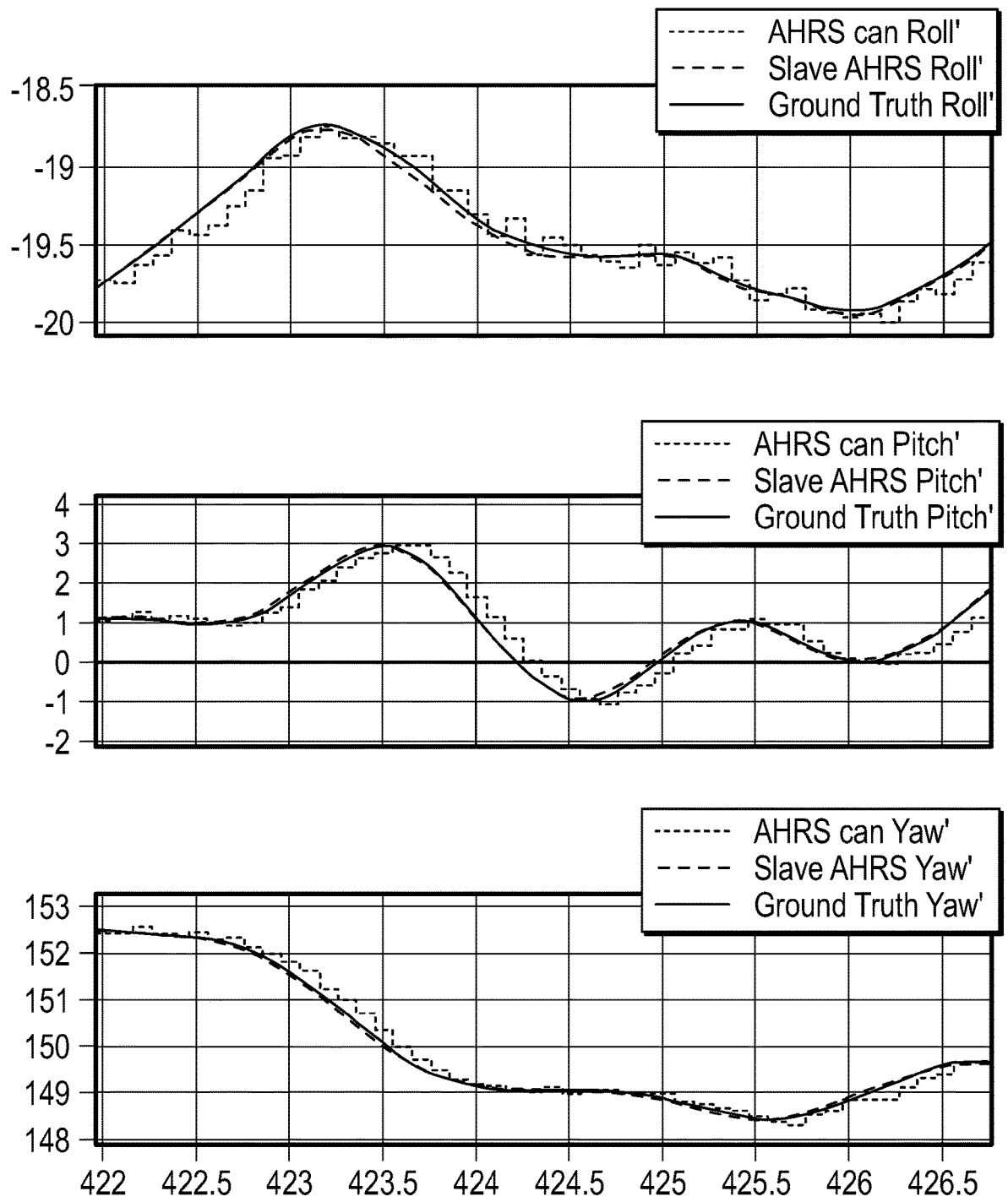
FIG. 6 illustrates a diagram of results of removing bus latency of an AHRS equipped system in accordance with an embodiment of the disclosure.

FIG. 6 illustrates a diagram of results of removing bus latency of an AHRS equipped system in accordance with an embodiment of the disclosure. As shown in FIG. 6, using the techniques disclosed herein, data from the slave AHRS may accurately track movement of the mobile structure (e.g., ground truth roll). In particular, the signals comprising a series of step functions (e.g., horizontal flat periods coupled to each other with vertical jumps/steps, illustrated by the close-dashed traces) are the primary/master AHRS-provided measurements of the roll (top graph), pitch (middle graph), and yaw (bottom graph) of mobile structure 101, where the horizontal periods roughly indicate the update rate of the AHRS and the horizontal error/distance between those signals and the two other signals roughly indicate the latency of the AHRS measurements and their propagation through the network relative to the actual (Ground Truth) RPY of mobile structure 101. The local gyroscope measurement of the RPY of mobile structure 101, when corrected for bias/drift through the methods described herein (e.g., through time-compensated comparison to the AHRS measurements), follows the actual RPY of mobile structure 101 so closely (e.g., with negligible latency and relatively fast (5×, 10×, or higher) update rate) so as to be indistinguishable from the actual RPY of mobile structure 101 at the scale represented in the graphs provided in FIG. 6.

Figure 7:
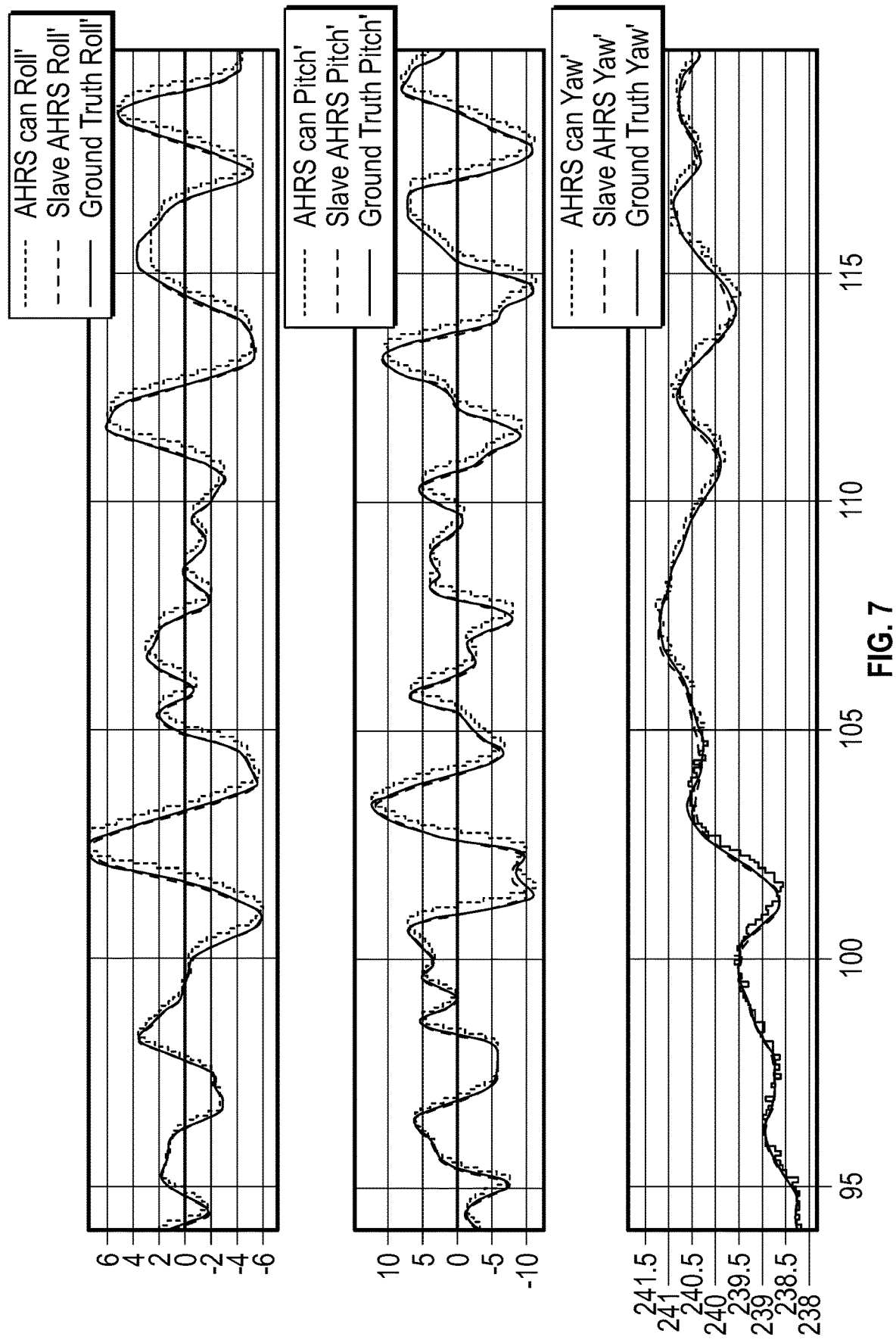
FIG. 7 illustrates another diagram of results of removing bus latency of an AHRS equipped system in accordance with an embodiment of the disclosure.

FIG. 7 illustrates another diagram of results of removing bus latency of an AHRS equipped system in accordance with an embodiment of the disclosure, where the different signals can be differentiated as discussed with reference to FIG. 6. FIG. 7 may illustrate the technique of removing bus latency when the time delay is unknown/variable. In FIG. 7, a delay of 100 ms may be introduced at 100 seconds (e.g., at roughly 20% of the width of the graph). As shown, the techniques disclosed herein allowed for corrections compensating for the changing delay to be rapidly performed and the slave AHRS to continue to accurately track movement of the mobile structure.

Figure 11:
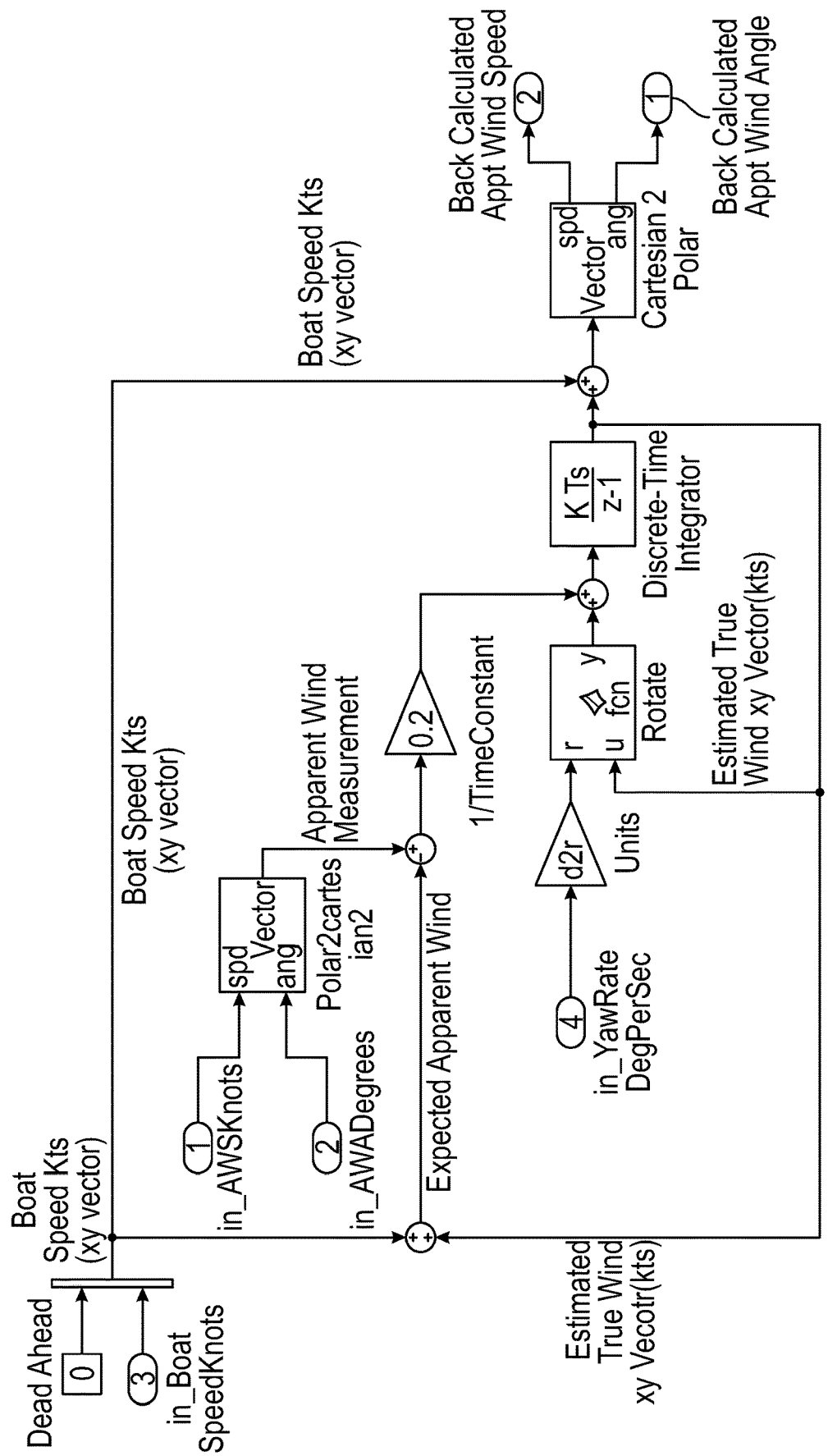
Figure 12:
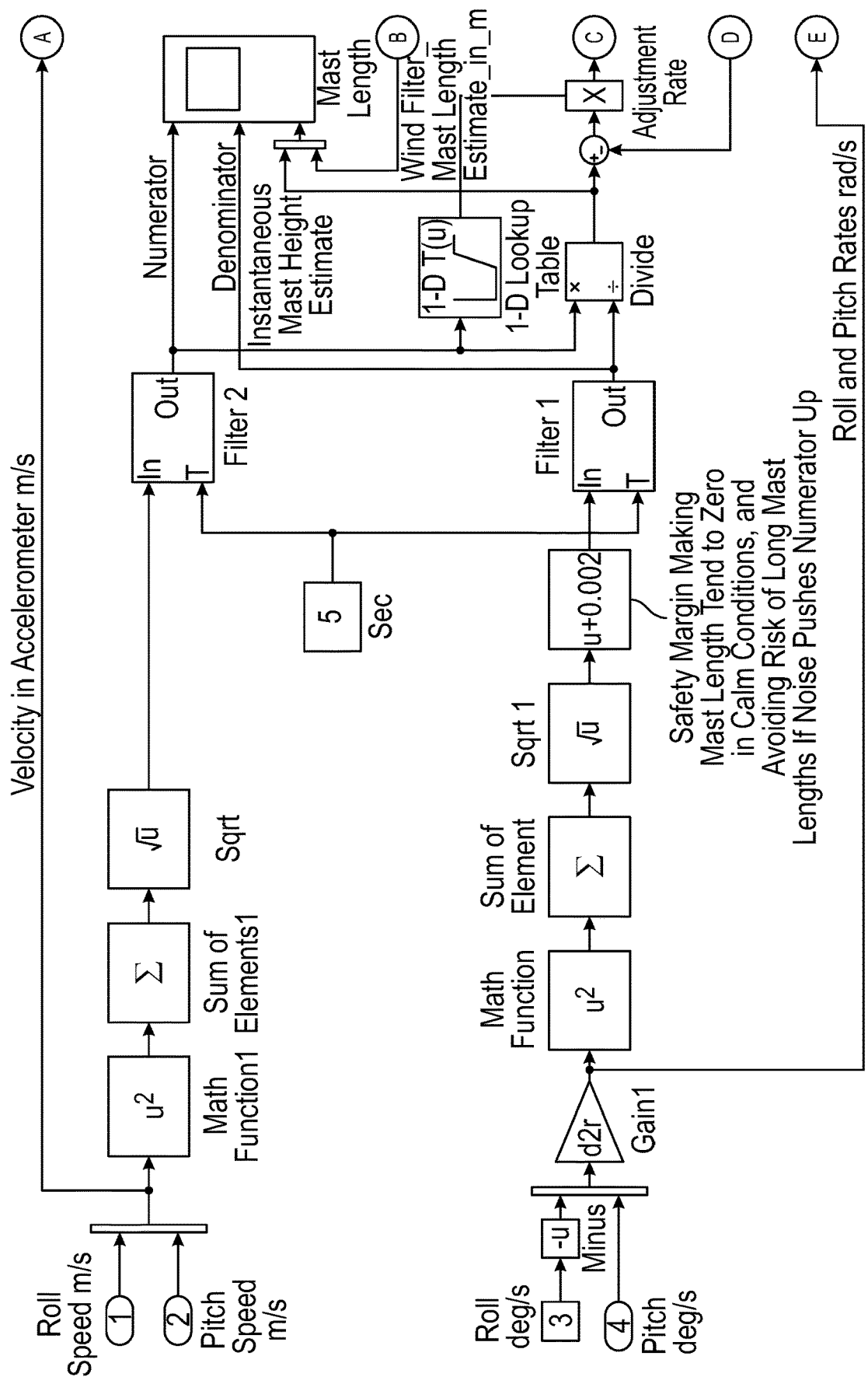
Figure 12:
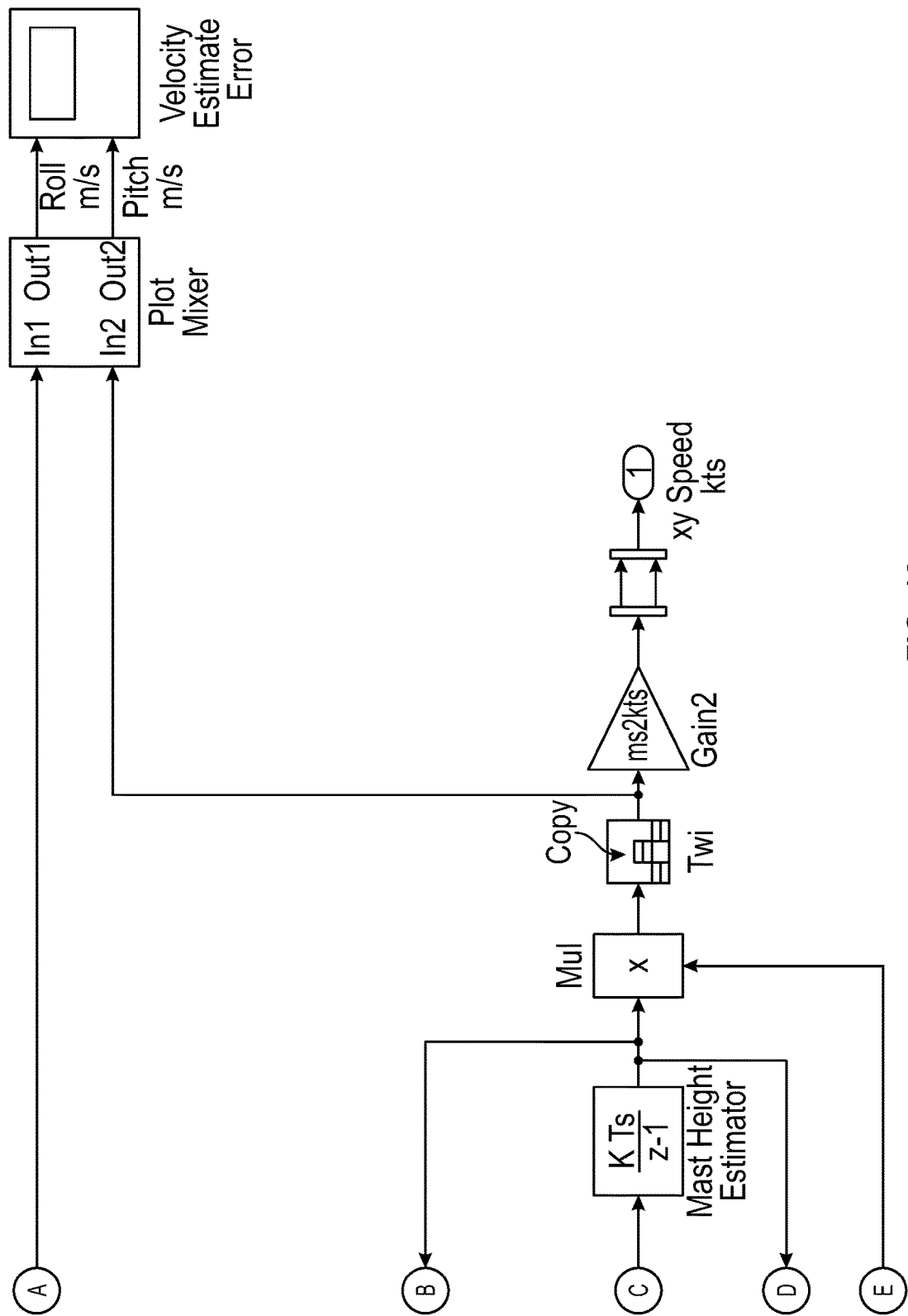

FIGS. 8-12 illustrate system/control loop diagrams for performing the processes described herein in accordance with an embodiment of the disclosure. FIGS. 8-10 illustrate system/control loop diagrams of implementations for removing bus latency. FIGS. 11 and 12 illustrate system/control loop diagrams of implementations for determining wind velocity and/or direction using techniques for removing bus latency, as described herein.

In FIG. 8, a primary/master AHRS RPY may be received at element 802, gyroscope rates may be received at element 804, and a delay time may be received at element 806. In FIG. 8, a roll, pitch, and yaw (RPY) rate may be estimated by, for example, receiving an RPY rate estimate and a measured gyroscope (body) rate in element 808. The resulting Euler RPY rate may then be estimated through the function RPY rate=Tinv*gyroscope rate, where Tinv=[1, sin(R)*tan(P), cos(R)*tan(P); 0, cos(R), −sin(R); 0, sec(P)*sin(R), cos(R)*sec(P)]. The RPY angle estimate may be determined from integration of the RPY rate and a fine-tune term determined by the residual 810 multiplied by the Kalman gain 812. In certain embodiments, the residual may be an error between the master AHRS RPY signal and the RPY estimate after time shifting the estimate by the mean delay (latency), as shown.

FIG. 9 illustrates a similar embodiment where the delay rate is unknown and is instead integrated as a seventh state of the Kalman filter arrangement 900 shown in FIG. 9. FIG.

10 illustrates a further embodiment where there is a roll/pitch offset of the installation of the secondary sensor (incorporating the slave AHRS). In such embodiments, further states may be added to the Kalman filter arrangement to estimate these additional unknowns. For example, it has recently become commonplace for mems chip makers to integrate gyroscopes and accelerometers in the same low cost package. The alignment of the gyroscope to the accelerometer is then set with high precision at the foundry. It is then possible to use the accelerometer output to align the gyro in roll and pitch. A corresponding Kalman filter arrangement can be augmented from a 6 state to a 9 state solution, as shown in FIG. 10.

FIG. 11 illustrates an embodiment system/control loop where wind velocity measurements are converted into apparent wind velocities (e.g., speed and direction) using the techniques described herein to reduce bus latency errors. In the embodiment shown in FIG. 11, the filter arrangement converts speed/angle formats into xy vector velocities, and defines a state (modelled as an integrator) which is the estimated true wind vector. The estimated true wind is modified using the yaw rate signal input, so that if the boat turns to starboard 10° then the true wind vector will turn to port by 10°. In FIG. 11, this is seen as a Rotate function, and this is how the filter achieves responsiveness to turning. The estimated wind velocity is then converted to apparent by adding the boat speed vector, so that the expected apparent wind measurement is obtained. The error between the actual and expected measurements is used to improve the estimated true wind vector, through a time constant so that measurement noise is attenuated, leaving the estimate both responsive to vessel turning and unaffected by short term fluctuations from masthead motion. The true wind vector is converted back to apparent by adding the boat speed vector and then returned to speed/angle format. Further refinements may be used to account for masthead motion, which may use embodiments of the bus latency compensation to reduce measurements errors, as described herein.

FIG. 12 illustrates an embodiment system/control loop to compensate for masthead motion using the techniques described herein to reduce bus latency errors. The masthead motion compensation implementation shown in FIG. 12 fuses roll and pitch rates from a motion sensor (e.g. a master AHRS) with velocity data (e.g., from a masthead accelerometer slave AHRS). The deg/s rates will be accurate, but the mast height may be unknown and so the rates cannot be simply converted to m/s. Asking a user to enter a value for the mast height can be problematic (e.g., user parametrization can be difficult with fickle customers), so the integrated accelerometer derived velocities may be used to calibrate the roll and pitch rates. The accelerometer derived velocities typically cannot be used directly because they can suffer from errors during tacking where the mast undergoes a sustained acceleration that falls outside the high pass cut off bandwidth. FIG. 12 shows an example implementation to compensate for such issues.

For example, as shown in FIG. 12, the velocity and pitch/roll rates may be obtained as the magnitude of the input vectors, filtered with a 5 s filter to smooth the effects of short term pitch and roll. For circular motion $v=r\omega$, the ratio between the speed and rate is the mast height (e.g., mast height=$r=v/\omega$). To protect this division against infinity where $\omega$ is zero (flat calm), a small offset may be added to $\omega$. This estimate of the mast height may be filtered with a time constant that varies according to conditions; faster filtering is possible when there is plenty of masthead velocity, and the filter is held (lookup table output is zero) when masthead velocity is low. The filter output is the final mast height estimate, which is used to generate the velocity of the mast head, and thereby, the wind sensor, which may be used to compensate measured wind speed and direction, as described herein. Measurements by the masthead slave AHRS may be used to generate updated/corrected measurements that eliminate bus-related timing errors, as described herein.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into substeps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. An apparatus comprising: a gyroscope; an attitude and heading reference system (AHRS); a controller configured to communicate with a plurality of navigational sensors comprising at least the gyroscope and the AHRS, wherein each navigational sensor is configured to provide navigational data associated with a mobile structure, and the controller is configured to: receive first attitude and/or heading data from the AHRS over a network comprising a network latency; receive first angular velocity data from the gyroscope, wherein the first angular velocity data is received according to no latency or lower latency than the network latency; determine a first orientation of the mobile structure from the first attitude and/or heading data from the AHRS; determine a first slave orientation of the mobile structure based, at least in part, on the first angular velocity data from the gyroscope; receive updated attitude and/or heading data from the AHRS over the network; determine a time delay indicative of the network latency, wherein the determining the time delay is based, at least in part, on comparing the first slave orientation and the updated attitude and/or heading data from the AHRS; and determine a second orientation of the mobile structure based, at least in part, on the first slave orientation and the time delay.

2. The apparatus of claim 1, wherein:
the determining the first slave orientation is based, at least in part, on the first angular velocity data from the gyroscope and the first attitude and/or heading data from the AHRS; and the determining the second orientation of the mobile structure is based, at least in part, on the first slave orientation, the time delay, and the updated attitude and/or heading data from the AHRS.

3. The apparatus of claim 1, wherein the controller is further configured to:
determine a first true orientation based, at least in part, on a comparison of the first slave orientation and the first AHRS orientation.

4. The apparatus of claim 1, wherein determining the time delay comprises:
determining a mean delay indicative of a latency associated with the ARHS communicating the first attitude and/or heading data and the controller receiving the first attitude and/or heading data; and
determining a fine-tune term for use within an integration portion of a Kalman filter arrangement, wherein the fine-tune term comprises a difference between the first attitude and/or heading data and the first slave orientation after time shifting the first slave orientation by the mean delay.

5. The apparatus of claim 1, wherein the first attitude and/or heading data is received at a first time period and the first angular velocity data is received at a second time period.

6. The apparatus of claim 5, wherein a difference between the first time period and the second time period comprises a latency between the AHRS sensing the first attitude and/or heading and the controller receiving the first attitude and/or heading data.

7. The apparatus of claim 1, wherein the controller is communicatively coupled to and remote from the AHRS.

8. The apparatus of claim 1, wherein the controller is further configured to:
calibrate a coordinate frame of the gyroscope to a coordinate frame of the AHRS.

9. The apparatus of claim 1, wherein the mobile structure comprises a watercraft.

10. The apparatus of claim 1, wherein the controller is further configured to:
determine a wind speed and/or direction experienced by the mobile structure based, at least in part, on the second slave orientation.

11. The apparatus of claim 10, wherein determining the wind speed and/or direction further comprises:
determining a mobile structure control input; and
correcting the second slave orientation based, at least in part, on the mobile structure control input.

12. The apparatus of claim 1, further comprising an actuator for changing an orientation of the mobile structure and/or of at least one said sensor in response to the determining the second orientation.

13. A method comprising: receiving by a controller, over a network comprising a network latency, first attitude and/or heading data from an attitude and heading reference system (AHRS) coupled by the network to the controller; receiving, by the controller, first angular velocity data from a gyroscope, wherein the first angular velocity data is received according to no latency or lower latency than the network latency; determining by the controller a first orientation of a mobile structure from the first attitude and/or heading data from the AHRS; determining by the controller a first slave orientation of the mobile structure based, at least in part, on the first angular velocity data from the gyroscope; receiving, by the controller, updated attitude and/or heading data from the AHRS over the network; determining by the controller a time delay indicative of the network latency, wherein the determining the time delay is based, at least in part, on comparing the first slave orientation and the updated attitude and/or heading data from the AHRS; and determining by the controller a second orientation of the mobile structure based, at least in part, on the first slave orientation and the time delay.

14. The method of claim 13, wherein:
the determining the second orientation of the mobile structure is based, at least in part, on the first slave orientation, the time delay, and the updated attitude and/or heading data from the AHRS.

15. The method of claim 13, further comprising:
determining a first true orientation based, at least in part, on a comparison of the first slave orientation and the first AHRS orientation.

16. The method of claim 13, wherein determining the time delay comprises:
determining a mean delay indicative of a latency associated with the ARHS communicating the first attitude and/or heading data and the controller receiving the first attitude and/or heading data; and
determining a fine-tune term for use within an integration portion of a Kalman filter arrangement, wherein the fine-tune term comprises a difference between the first attitude and/or heading data and the first slave orientation after time shifting the first slave orientation by the mean delay.

17. The method of claim 13, wherein the first attitude and/or heading data is received at a first time period and the first angular velocity data is received at a second time period, and wherein a difference between the first time period and the second time period comprises a latency between the AHRS sensing the first attitude and/or heading and the controller receiving the first attitude and/or heading data.

18. The method of claim 13, further comprising:
determining a wind speed and/or direction experienced by the mobile structure based, at least in part, on the second slave orientation.

19. The method of claim 13, further comprising changing an orientation of the mobile structure and/or of at least one said sensor in response to the determining the second orientation.

* * * * *

UNITED STATES PATENT AND TRADEMARK OFFICE
CERTIFICATE OF CORRECTION

PATENT NO. : 10,837,780 B2
APPLICATION NO. : 15/785319
DATED : November 17, 2020
INVENTOR(S) : Mark Johnson, Chris Hodgson and Christopher Yeomans Page 1 of 1

It is certified that error appears in the above-identified patent and that said Letters Patent is hereby corrected as shown below:

In the Specification

Column 15, Line 28, change "rioted" to --noted--.

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*